United States Patent
Ito et al.

(10) Patent No.: US 12,196,500 B2
(45) Date of Patent: Jan. 14, 2025

(54) HEAT EXCHANGE SYSTEM

(71) Applicant: CKD CORPORATION, Komaki (JP)

(72) Inventors: Akihiro Ito, Komaki (JP); Takahiro Minatani, Komaki (JP); Shinichi Nitta, Komaki (JP)

(73) Assignee: CKD CORPORATION, Komaki (JP)

( * ) Notice: Subject to any disclaimer, the term of this patent is extended or adjusted under 35 U.S.C. 154(b) by 555 days.

(21) Appl. No.: 17/440,812

(22) PCT Filed: Mar. 19, 2020

(86) PCT No.: PCT/JP2020/012293
§ 371 (c)(1),
(2) Date: Sep. 20, 2021

(87) PCT Pub. No.: WO2020/217800
PCT Pub. Date: Oct. 29, 2020

(65) Prior Publication Data
US 2022/0187027 A1    Jun. 16, 2022

(30) Foreign Application Priority Data
Apr. 23, 2019    (JP) .................. 2019-081863

(51) Int. Cl.
*F28D 20/02*    (2006.01)
(52) U.S. Cl.
CPC .................. *F28D 20/021* (2013.01)
(58) Field of Classification Search
CPC ........... F28D 20/021; F28D 2021/0029; F28D 20/02; F28D 20/0535; F28D 20/0039;
(Continued)

(56) References Cited

U.S. PATENT DOCUMENTS

2010/0206519 A1*  8/2010  Cho ................. H01L 21/67248
                                                    165/104.19
2010/0263842 A1* 10/2010  Ast ........................ F22B 37/107
                                                       216/37
(Continued)

FOREIGN PATENT DOCUMENTS

JP    2006-038266 A    2/2006
JP    2009-250810 A   10/2009
(Continued)

OTHER PUBLICATIONS

May 26, 2020 International Search Report issued in International Patent Application No. PCT/JP2020/012293.
(Continued)

*Primary Examiner* — Frantz F Jules
*Assistant Examiner* — Webeshet Mengesha
(74) *Attorney, Agent, or Firm* — Oliff PLC

(57) ABSTRACT

A heat exchange system is arranged between a chiller device and a temperature control member, and is provided with: supply line for supplying a refrigerant from the chiller device to the temperature control member; a return line for returning the refrigerant from the temperature control member to the chiller device; a bypass line for bypassing the supply line and the return line; a latent heat storage member arranged closer to the chiller device relative to a first connection point connecting the return line and the bypass line; and a flow distribution unit that is arranged at a second connection point connecting the outgoing line and the bypass line, and that is for adjusting a ratio for distributing refrigerant to the temperature control member and the bypass line.

15 Claims, 15 Drawing Sheets

(58) Field of Classification Search
CPC .............. F25B 1/00; H01L 21/67248; H01L 21/67017; G05D 23/00; C23C 16/463
See application file for complete search history.

(56) References Cited

U.S. PATENT DOCUMENTS

2012/0227926 A1\* 9/2012 Field .................. F24S 10/95
165/157
2019/0244840 A1\* 8/2019 Lim .................... C23C 16/463

FOREIGN PATENT DOCUMENTS

| JP | 5912439 B2 | 4/2016 |
| JP | 2019-009433 A | 1/2019 |
| KR | 10-2009-0106452 A | 10/2009 |

OTHER PUBLICATIONS

Sep. 28, 2021 International Preliminary Report on Patentability issued in International Patent Application No. PCT/JP2020/012293.
Apr. 1, 2022 Office Action issued in Chinese Patent Application No. 202080030876.4.
Mar. 21, 2023 Office Action issued in Korean Patent Application No. 10-2021-7033928.

\* cited by examiner

FIG. 8A

| STEADY DRIVING OPERATION →HEAT EXCHANGE OPERATION | HEAT EXCHANGE OPERATION →STEADY DRIVING OPERATION |
|---|---|
| ・RECEIVE SET TEMP. DECREASING INFORMATION<br><br>・TEMP. INCREASE<br><br>・RECEIVE HEAT-INPUT ON INFORMATION<br><br>・FLOW DISTRIBUTION RATIO | ・TEMP. IS STABLE<br><br>・ELAPSE OF SET TIME<br><br>・FLOW DISTRIBUTION RATION |

FIG. 8B

| STEADY DRIVING OPERATION →HEAT EXCHANGE OPERATION | HEAT EXCHANGE OPERATION →STEADY DRIVING OPERATION |
|---|---|
| ・RECEIVE SET TEMP. INCREASING INFORMATION<br><br>・TEMP. DECREASE<br><br>・RECEIVE HEAT-INPUT OFF INFORMATION<br><br>・FLOW DISTRIBUTION RATIO | ・TEMP. IS STABLE<br><br>・ELAPSE OF SET TIME<br><br>・FLOW DISTRIBUTION RATION |

HEAT EXCHANGE SYSTEM

CROSS-REFERENCE TO RELATED APPLICATIONS

This is a US national phase application based on the PCT International Patent Application No. PCT/JP2020/012293 filed on Mar. 13, 2020, and claiming the priority to Japanese Patent Application No. 2019-081863 filed on Apr. 23, 2019, the entire contents of which are incorporated by reference herein.

TECHNICAL FIELD

The present invention relates to a heat exchange system.

BACKGROUND ART

For example, a semiconductor manufacturing device is configured to perform an etching process on a wafer placed on a work table and chucked by electrostatic chuck. When a temperature-regulating fluid adjusted at a predetermined temperature in a chiller device is circulated between the chiller device and the electrostatic chuck, the electrostatic chuck is controlled to a designated set temperature to regulate the temperature of the wafer to a uniform temperature (e.g., see Patent Document 1).

RELATED ART DOCUMENTS

Patent Documents

Patent Document 1: Japanese Patent No. 5912439

SUMMARY OF INVENTION

Problems to be Solved by the Invention

However, the related art has the following problems. In the related art, specifically, the temperature-regulating fluid after flowing through the electrostatic chuck is directly returned to the chiller device. This results in a large temperature difference between the temperature-regulating fluid returned to the chiller device and the temperature-regulating fluid stored in the chiller device, so that the chiller device is subjected to a large load to regulate the temperature of the temperature-regulating fluid.

The present invention has been made to address the above problems and has a purpose to provide a heat exchange system capable of reducing a load applied to a chiller device with energy saving.

Means of Solving the Problems

One aspect of the present disclosure provides a heat exchange system configured as below. (1) A heat exchange system placed between a chiller device and a control target object, the heat exchange system comprises: a supply line for supplying a thermal medium from the chiller device to the control target object; a return line for returning the thermal medium from the control target object to the chiller device; a bypass line for bypassing the supply line and the return line; a latent heat storage member placed in the return line at a position closer to the chiller device relative to a first connection point at which the return line and the bypass line connect to each other, the latent heat storage member being configured to store and release heat; and a first flow distribution unit placed at a second connection point at which the supply line and the bypass line connect to each other or at a position in the supply line closer to the control target object relative to the second connection point, the first flow distribution unit being configured to distribute the thermal medium to the control targe and the bypass line.

In the heat exchange system configured as above, a temperature difference between the thermal medium returned from the control target object to the chiller device and the thermal medium stored in the chiller device is reduced by utilization of the heat energy of the latent heat storage member and the merging of the thermal medium supplied from the chiller device toward the control target object with the thermal medium returned from the control target object toward the chiller device, so that a load on the chiller device can be reduced. Further, for example, the foregoing heat exchange system can also flow the thermal medium supplied from the chiller device only to the bypass line through the first flow distribution unit so that the latent heat storage member is regenerated by the heat of the thermal medium. Thus, a load on the chiller device can be reduced with energy saving.

(2) In the heat exchange system set forth in (1), preferably, the return line branches into a first branch line and a second branch line at a first branch point provided upstream of the first connection point, the heat exchange system includes a passage switching unit placed in the first branch point and configured to supply the thermal medium flowing from the control target object into the return line to the first branch line or the second branch line, the first branch line includes the first connection point, connects to the bypass line, and communicates with the chiller device, and further the latent heat storage member is placed in the first branch line at a position closer to the chiller device relative to the first connection point, and the second branch line connects to the first branch line at a third connection point provided at a position closer to the chiller device relative to the latent heat storage member.

In the heat exchange system configured as above, only the thermal medium supplied from the chiller device toward the control target object is supplied to the latent heat storage member to regenerate the latent heat storage member. This system can therefore achieve a good efficiency of regenerating the latent heat storage member.

(3) In the heat exchange system set forth in (2), preferably, the return line includes the first branch line further branching into a third branch line and a fourth branch line at a second branch point located at a position closer to the chiller device relative to the first connection point, the heat exchange system includes a second flow distribution unit provided at the second branch point and configured to distribute the thermal medium flowing in the first branch line through the bypass line to the third branch line and the fourth branch line, the third branch line is provided with the third connection point and connects to the second branch line and communicates with the chiller device, and the fourth branch line connects to the second branch line, and the latent heat storage member is placed in the fourth branch line.

The heat exchange system configured as above can avoid unnecessary regeneration of the latent heat storage member. Thus, the energy-saving effect can be enhanced.

(4) In the heat exchange system set forth in (2) or (3), preferably, the thermal medium is a low-temperature medium for cooling the control target object, the latent heat storage member is configured such that: a heat storage temperature is set lower than a temperature of the thermal medium flowing from the control target object to the return line; and when the passage switching unit switches a flow passage for supplying the thermal medium to the first branch line, the thermal medium flowing from the control target object to the return line is cooled by stored heat energy, or when the passage switching unit switches the flow passage for supplying the thermal medium to the second branch line, the latent heat storage member is regenerated by the thermal medium flowing in the first branch line through the bypass line.

In the heat exchange system configured as above, even when the temperature control member is cooled by the thermal medium, the regeneration efficiency of the latent heat storage member can be enhanced and the load on the chiller device can be reduced.

(5) In the heat exchange system set forth in (2) or (3), preferably, the thermal medium is a high-temperature medium for heating the control target object, the latent heat storage member is configured such that: a heat storage temperature is set higher than a temperature of the thermal medium flowing from the control target object to the return line; and when the passage switching unit switches a flow passage for supplying the thermal medium to the first branch line, the thermal medium flowing from the control target object to the return line is heated by stored heat energy, or when the passage switching unit switches the flow passage for supplying the thermal medium to the second branch line, the latent heat storage member is regenerated by the thermal medium flowing from the bypass line to the first branch line.

In the heat exchange system configured as above, even when the temperature control member is heated by the thermal medium, the regeneration efficiency of the latent heat storage member can be enhanced and the load on the chiller device can be reduced.

(6) In the heat exchange system set forth in one of (1) to (5), preferably, the control target object is a temperature control member placed in a reaction container of a semiconductor manufacturing device and configured to control a temperature of a wafer.

According to the heat exchange system configured as above, although a large difference occurs between the temperature of the thermal medium adjusted by the chiller device and the temperature of the temperature control member, the latent heat storage member adjusts the temperature of the thermal medium returned from the temperature control member close to the temperature of the thermal medium stored in the chiller device before the thermal medium is returned to the chiller device. Thus, the above-configured heat exchange system can further enhance the efficiency of reducing the load on the chiller device.

(7) In the heat exchange system set forth in one of (1) to (6), preferably, the latent heat storage member is a heat storage unit including: a pipe member provided with a flow passage for flowing the thermal medium; and a heat exchange member filled with latent heat storage material and placed in surface contact with the pipe member.

In the heat exchange system configured as above, the thermal medium in flowing through the pipe member exchanges heat with the heat exchange member, so that the heat exchange efficiency between the thermal medium and the heat exchange member can be improved.

(8) In the heat exchange system set forth in (7), preferably, the pipe member is internally provided with a first metal fiber sheet in contact with an inner wall of the flow passage, and the first metal fiber sheet includes voids allowing the thermal medium to flow in.

In the heat exchange system configured as above, the thermal medium flows through the pipe member by passing through the voids of the metal fiber sheet, thus exchanging heat with the heat exchange member through the metal fiber sheet and the pipe member. Thus, the heat exchange efficiency between the thermal medium and the heat exchange member can be improved while suppressing pressure loss caused when the thermal medium flows through the heat storage unit.

(9) In the heat exchange system set forth in (7) or (8), preferably, the pipe member and the heat exchange member each have a thin rectangular parallelepiped shape and are stacked.

The heat exchange system configured as above can enhance the heat exchange efficiency between the pipe member and the heat exchange member while providing a high flow rate of the thermal medium.

(10) In the heat exchange system set forth in one of (7) to (9), preferably, the heat exchange member includes: a casing having an internal space filled with the latent heat storage material; and a second metal fiber sheet placed in the internal space, and the second metal fiber sheet is in contact with the casing.

According to the heat exchange system configured as above, the heat energy of the latent heat storage material is easily transmitted to the casing through the metal fiber sheet and thus the thermal medium and the latent heat storage material are allowed to efficiently exchange heat with each other. Even when the latent heat storage member is designed to be compact, the load on the chiller device can be reduced.

Furthermore, another aspect of the invention provides a heat exchange system placed between a first chiller device for storing a first thermal medium, a second chiller device for storing a second thermal medium higher in temperature than the first thermal medium, and a control target object whose temperature is controlled by use of a temperature-regulating fluid, the heat exchange system comprising: a main circulation circuit configured to circulate the temperature-regulating fluid through the control target object and provided with a merging section and a diverging section provided between the merging section and the control target object; a first supply line for supplying the first thermal medium from the first chiller device to the merging section; a first return line for returning the temperature-regulating fluid from the diverging section to the first chiller device; a first bypass line for bypassing the first supply line and the first return line; a first latent heat storage member placed in the first return line at a position closer to the first chiller device relative to a low-temperature side connection point at which the the first return line and the first bypass line connect to each other, the first latent heat storage member being configured to store and release heat; a second supply line for supplying the second thermal medium from the second chiller device to the merging section; a second return line for returning the temperature-regulating fluid from the merging section to the second chiller device; a second bypass line for bypassing the second supplying line and the second return line; a second latent heat storage member placed in the second return line at a position closer to the second chiller device relative to a high-temperature side connection point at which the second return line and the second bypass line connect to each other, the second latent heat storage member being configured to store and release heat, the second latent heat storage member being higher in heat storage temperature than the first latent heat storage member; a flow distribution unit placed in the merging section and configured to distribute the temperature-regulating fluid, the first thermal medium, and the second thermal medium toward a control target object, the first bypass line, and the second bypass line; and a flow divergence control unit placed in the diverging section and configured to diverge the temperature-regulating fluid toward the main circulation circuit, the first return line, and the second return line.

Effects of the Invention

According to the present invention, a heat exchange system capable of reducing a load on a chiller device with energy-saving can be provided.

BRIEF DESCRIPTION OF THE DRAWINGS

FIG. 8A is a table showing a concrete example of switching conditions that are applied to a unit configured to supply a thermal medium whose temperature is lower than a set temperature of a temperature control member to the temperature control member to thereby regulate the temperature of the temperature control member;

FIG. 8B is a table showing a concrete example of switching conditions that are applied to a unit configured to supply a thermal medium whose temperature is higher than a set temperature of a temperature control member to the thermal medium to thereby regulate the temperature of the thermal medium;

MODE FOR CARRYING OUT THE INVENTION

A detailed description of embodiments of a heat exchange system according to the present invention will now be given referring to the accompanying drawings.

First Embodiment

Figure 1:
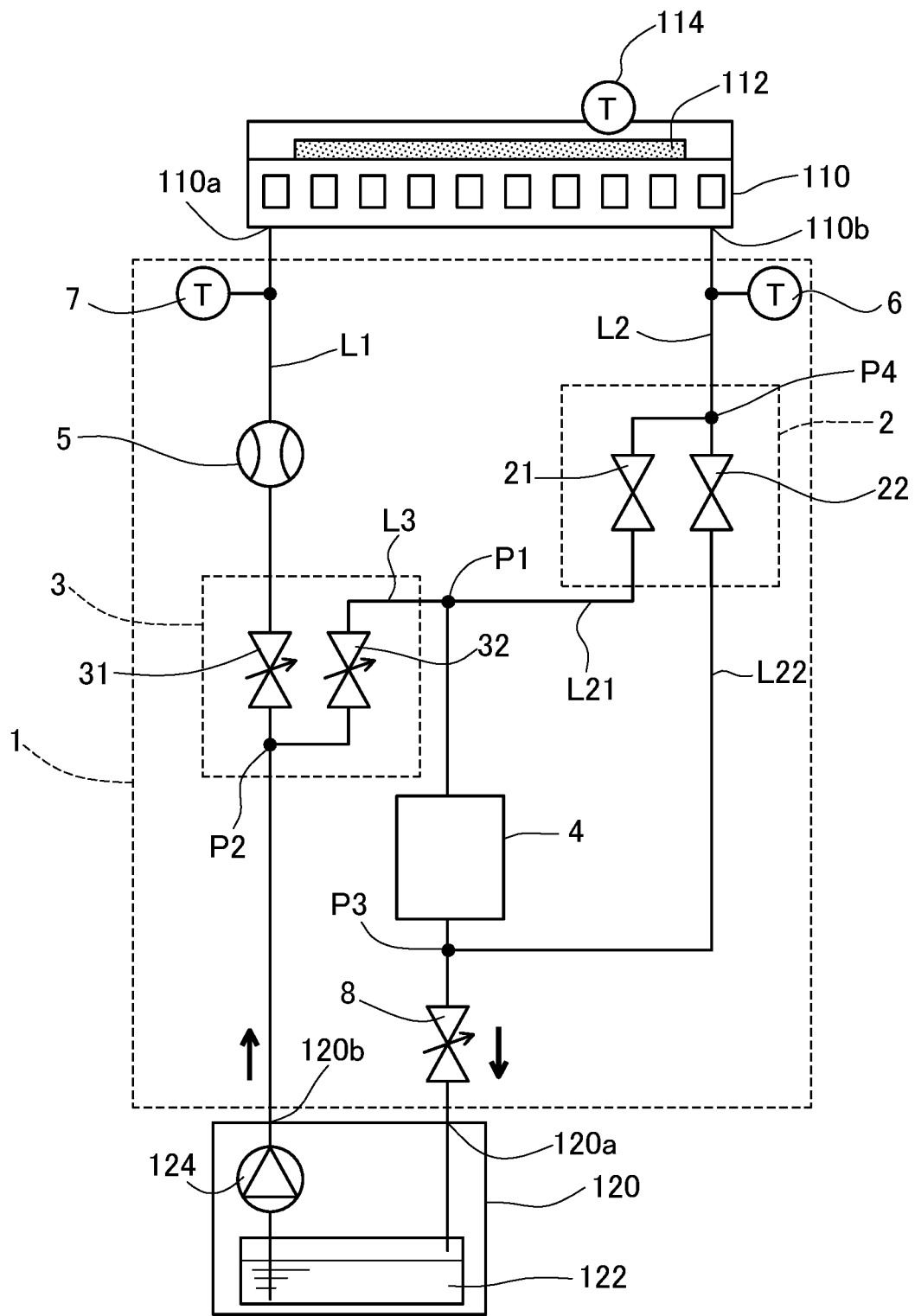
FIG. 1 is a schematic configuration diagram of a heat exchange system in a first embodiment of the present invention.

FIG. 1 is a schematic configuration diagram of a heat exchange system 1 in the first embodiment according to the present invention. For example, a semiconductor manufacturing device is provided with the heat exchange system 1 on a circulation path for circulating a coolant between a temperature control member 110 and a chiller device 120. The coolant is one example of a "thermal medium". The chiller device 120 is configured to regulate the temperature of the coolant to a predetermined temperature and store the coolant. The temperature control member 110 is one example of a "control target object" to be controlled in temperature by the coolant supplied from the chiller device 120 and passed through the temperature control member 110.

The chiller device 120 is provided with a tank 122 and a pump 124. The tank 122 stores the coolant adjusted to the predetermined temperature. The pump 124 feeds the coolant stored in the tank 122 at a predetermined flow rate to the heat exchange system 1. The chiller device 120 in the present embodiment has a chiller capacity to control the temperature of coolant to a lower value than a set temperature of the temperature control member 110.

The temperature control member 110 is placed for example in a reaction container not shown for an etching process and configured to control the temperature of a wafer. The temperature control member 110 is provided with a heater 112 and a temperature sensor 114. The heater 112 heats the temperature control member 110. The temperature sensor 114 measures the temperature of the temperature control member 110. The temperature control member 110 is supplied with a coolant from the tank 122 of the chiller device 120 through the heat exchange system 1 according to the temperature measured by the temperature sensor 114 and adjusted to the set temperature. The coolant after flowing through the temperature control member 110 is returned to the tank 122 of the chiller device 120 through the heat exchange system 1.

The heat exchange system 1 is provided with a supply line L1, a return line L2, and a bypass line L3. Further, the heat exchange system 1 includes a first temperature sensor 6, a second temperature sensor 7, a passage switching unit 2, a flow distribution unit 3, a flow rate sensor 5, a heat storage unit 4, and a throttle valve 8. The flow distribution unit 3 is one example of a "first flow distribution unit". The heat storage unit 4 is one example of a "latent heat storage member".

The supply line L1 communicates an outlet port 120b of the chiller device 120 with an input part 110a of the temperature control member 110 to supply the coolant from the chiller device 120 to the temperature control member 110. The return line L2 branches at a branch point P4 into a first branch line L21 and a second branch line L22. The branch point P4 is one example of a "first branch point". The return line L2 communicates an outlet part 110b of the temperature control member 110 with the inlet port 120a of the chiller device 120 to return the coolant supplied to the temperature control member 110 back to the chiller device 120. The second branch line L22 connects to the first branch line L21 at a third connection point P3. The bypass line L3 connects the supply line L1 and the first branch line L21 of the return line L2 to supply the coolant from the supply line L1 to the first branch line L21 of the return line L2, not through the temperature control member 110.

The first temperature sensor 6 is placed on the return line L2. The first temperature sensor 6 measures the temperature (a first temperature) of the coolant flowing from the temperature control member 110 into the return line L2. The return line L2 branches at the branch point P4 located closer to the chiller device relative to the first temperature sensor 6, i.e., located more downstream than the first temperature sensor 6, into the first branch line L21 and the second branch line L22.

The passage switching unit 2 is placed at the branch point P4. The passage switching unit 2 is provided with a first open-close valve 21 and a second open-close valve 22. The first open-close valve 21 is placed in the first branch line L21 and the second open-close valve 22 is placed in the second branch line L22.

The first branch line L21 communicates with the inlet port 120a of the chiller device 120. In the first branch line L21, the heat storage unit 4 is placed between a first connection point P1 at which the first branch line L21 connects to the bypass line L3 and the third connection point P3 at which the first branch line L21 connects to the second branch line L22. In the first branch line L21, the throttle valve 8 is placed closer to the chiller device 120 relative to the third connection point P3, i.e., placed more downstream than the third connection point P3. The heat storage unit 4 is configured to store heat energy generated by phase change between solid and liquid. The heat storage unit 4 heats the coolant by releasing heat to the coolant by use of the stored heat energy according to the temperature of the coolant flowing through the first branch line L21. Further, the heat storage unit 4 absorbs the heat from the coolant to regenerate the stored heat energy. A concrete structure of the heat storage unit 4 will be described later. The throttle valve 8 adjusts pressure loss in a system that circulates the coolant between the temperature control member 110 and the chiller device 120. In other words, the throttle valve 8 serves to adjust the pressure of the coolant to be input to the inlet port 120a of the chiller device 120.

The second branch line L22 connects to the third connection point P3 in the first branch line L21 downstream of the heat storage unit 4 and forms a flow passage detouring the heat storage unit 4.

The bypass line L3 connects a second connection point P2 provided in the supply line L1 and the first connection point P1 provided in the first branch line L21 closer to the temperature control member 110 relative to the heat storage unit 4, i.e., provided more upstream than the heat storage unit 4. At the second connection point P2, the flow distribution unit 3 is provided. This flow distribution unit 3 may be placed in the supply line L1 at a position closer to the temperature control member 110 relative to the second connection point P2.

The flow distribution unit 3 includes a first opening proportional valve 31 and a second opening proportional valve 32. The first opening proportional valve 31 is placed in the supply line L1 and the second opening proportional valve 32 is placed in the bypass line L3. The flow distribution unit 3 is configured to synchronously operate the first opening proportional valve 31 and the second opening proportional valve 32 to relatively change the rate of distributing the coolant between the temperature control member 110 and the bypass line L3, while the total of the opening degree of the first opening proportional valve 31 and the opening degree of the second opening proportional valve 32 is constant, that is, the pressure loss of the coolant caused at the second connection point P2 is almost constant. The flow distribution unit 3 may be composed of a single spool valve.

In the supply line L1, the flow rate sensor 5 and the second temperature sensor 7 are placed closer to the temperature control member 110 relative to the flow distribution unit 3, i.e., placed more downstream than the flow distribution unit 3. The flow rate sensor 5 measures a flow rate of the coolant flowing from the flow distribution unit 3 to the temperature control member 110. In other words, the flow rate sensor 5 measures a flow rate of the coolant circulating between the temperature control member 110 and the chiller device 120. The second temperature sensor 7 measures the temperature (a second temperature) of the coolant flowing from the flow distribution unit 3 to the temperature control member 110. The flow rate sensor 5 and the second temperature sensor 7 may be positioned in reverse. The flow rate sensor 5 may be dispensed with.

Figure 2:
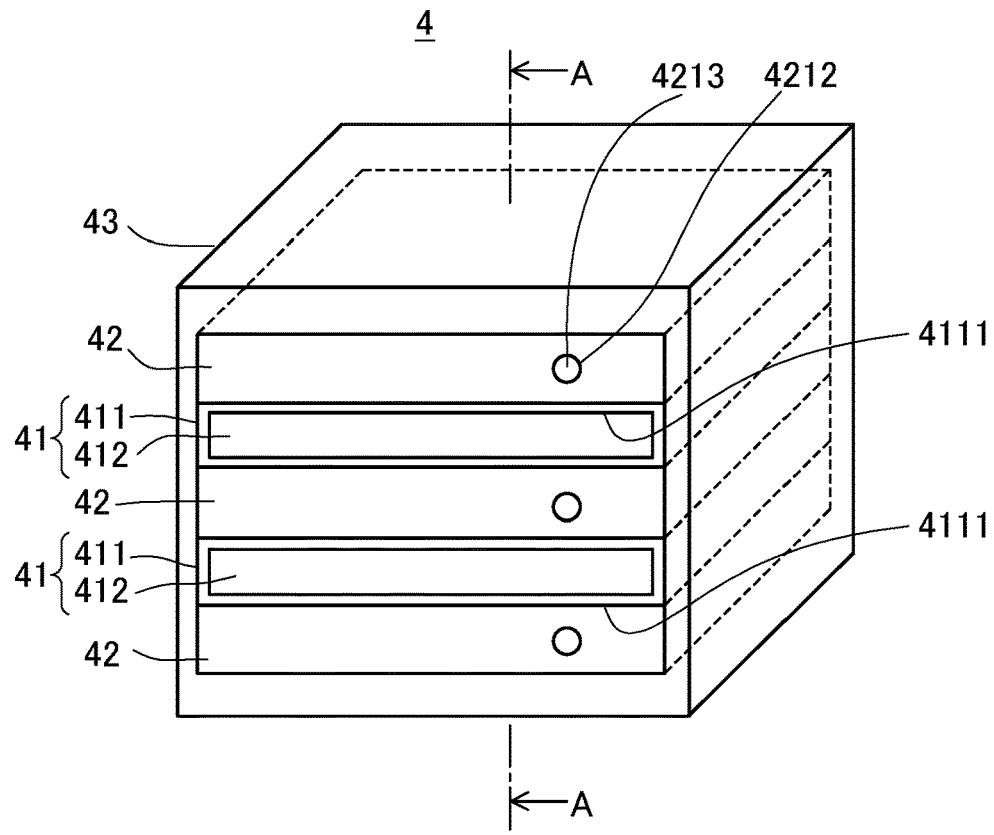
FIG. 2 is an external perspective view of a latent heat storage member.
Figure 3:
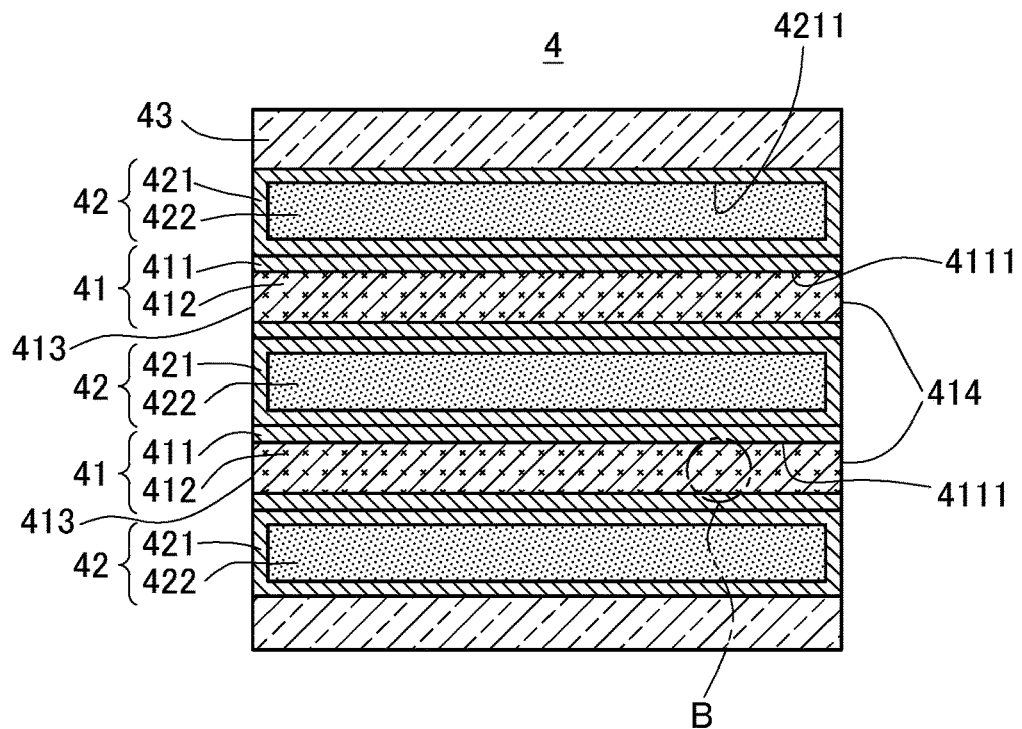
FIG. 3 is a cross-sectional view taken along a line A-A in FIG. 2.
Figure 4:
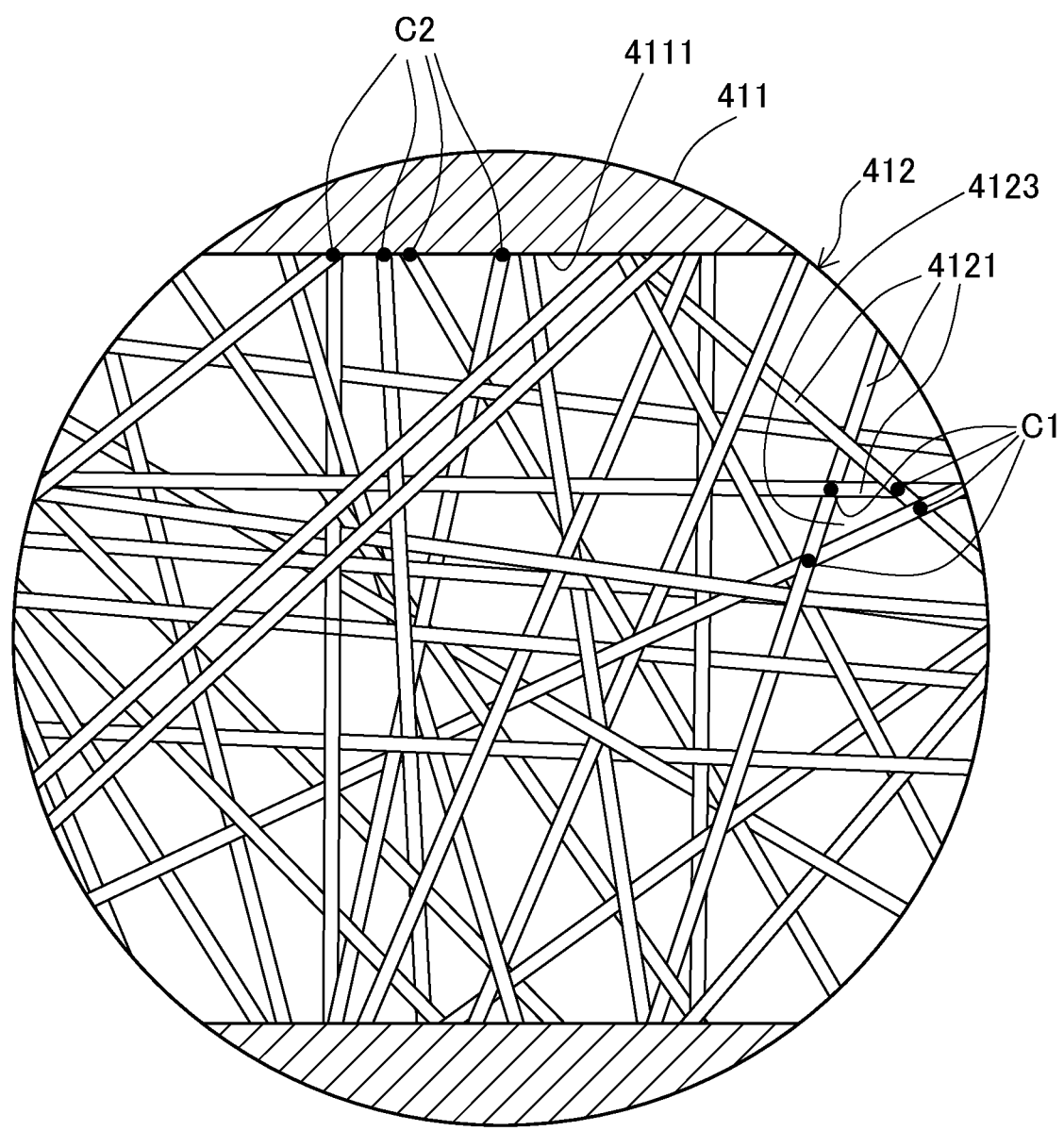
FIG. 4 is an enlarged view of a part B of FIG. 3.

The configuration of the foregoing heat storage unit 4 will be described with reference to FIGS. 2 to 4. FIG. 2 is an external perspective view of the heat storage unit 4. FIG. 3 is a cross-sectional view taken along a line A-A in FIG. 2. FIG. 4 is an enlarged view of a part B in FIG. 3. The heat storage unit 4 and its structural components are not limited in shape, dimensional ratio, and others to those in FIGS. 2 and 3. FIG. 4 schematically illustrates a state that the coolant penetrates in voids 4123 of a metal fiber sheet 412 to facilitate visualization thereof. However, the metal fibers 4121 and the voids 4123 are not limited in shape, density, and others thereto. For the heat storage unit 4 in the present embodiment, for example, the technique disclosed in Japanese unexamined patent application publication No. 2019-9433 is applied.

As shown in FIG. 2, the heat storage unit 4 has for example a box-like outer shape and includes passage forming members 41, heat exchange members 42, and a heat insulating material 43. The passage forming members 41 are each configured to form a flow channel for flowing a coolant and constitute a part of the first branch line L21. The heat exchange members 42 are each configured to exchange heat with the coolant through the corresponding passage forming member 41. Each of these passage forming members 41 and heat exchange members 42 has a thin rectangular parallelepiped shape with almost the same outer dimension. Thus, the passage forming members 41 and heat exchange members 42 can be stacked in block layers. For example, the passage forming members 41 and the heat exchange members 42 may be designed with different thicknesses as long as their contact surfaces have the same dimensions. Further, the rectangular parallelepiped shape is not limited to a strict rectangular parallelepiped shape but may be chamfered at an edge or edges, for example.

The passage forming members 41 and the heat exchange members 42 are placed in alternately stacking manner so that the heat exchange members 42 are located at both ends in a stacking direction. In the present embodiment, the passage forming members 41 are individually interposed between three heat exchange members 42, but the number of heat exchange members 42 and the number of passage forming members 41 are not limited thereto. The heat insulating material 43 is provided to cover the outer periphery of the stacked passage forming members 41 and heat exchange members 42. The passage forming members 41 and the heat exchange members 42 are insulated by the heat insulating material 43 from external heat. The passage forming members 41, the heat exchange members 42, and the heat insulating material 43 will be described in detail below.

As shown in FIG. 3, each passage forming member 41 includes a pipe member 411 and a metal fiber sheet 412. Each pipe member 411 has an upper surface located on the upper side in the figure and a lower surface having a wider area located on the lower side in the figure and has a thin rectangular parallelepiped outer shape with the upper surface and the lower surface connected through a pair of opposed side surfaces. The upper surface, the lower surface, and the pair of side surfaces of each pipe member 411 define a flow passage for flowing a coolant. Each pipe member 411 is formed with a passage plane 4111 so that the flow passage has a horizontally-long rectangular shape in cross-section when taken along a direction perpendicular to an axial direction of the flow passage to provide a large flow passage cross-sectional area. Each pipe member 411 is made of a high thermal conductive material, such as stainless steel, copper, and aluminum. Each pipe member 411 may be entirely made of the same material or partly made of different materials. For instance, the wider surfaces (the upper surface and the lower surface) in contact with the heat exchange members 42 may be made of a high thermal conductive material and the pair of opposed side surfaces may be made of another material, such as ceramic and plastic.

As shown in FIG. 4, each metal fiber sheet 412 is made of metal fibers 4121 formed in a sheet shape. The metal fiber sheet 412 is produced by the technique disclosed for example in Japanese unexamined patent application publication No. 2019-9433. The metal fiber sheet 412 may be composed of metal fibers 4121 alone or may be composed of any other fibers in combination with the metal fibers 4121. The metal fibers 4121 are preferably made of a high thermal conductive material, such as stainless steel, copper, and aluminum, in order to enhance the heat exchange efficiency. The metal fibers 4121 in the present embodiment are copper fibers superior in balance with rigidity and plastic deformability. In the metal fiber sheet 412, the metal fibers 4121 are physically fixed to each other, forming binding portions C1, thus forming voids 4123 between the metal fibers 4121. In the metal fiber sheet 412, the metal fibers 4121 at each binding portion C1 have been sintered to stabilize the thermal conductivity and the homogeneity of the metal fiber sheet 412. Furthermore, the pipe member 411 has been subjected to a sintering process while the metal fiber sheet 412 is accommodated therein, so that binding portions C2 are formed at which the metal fiber sheet 412 and the passage surface 4111 are stuck to each other. The binding portions C2 may bind directly to each other or indirectly to each other through another material. Further, at each binding portion C2, the pipe member 411 and the metal fibers 4121 may directly stick to each other or indirectly stick to each other through another material.

For example, in each of the passage forming members 41, when the coolant flows in an opening 413 located on the left side in FIG. 3, the coolant is introduced into the voids 4123 of the metal fiber sheet 412 and discharged out through an opening 414 located on the right side in the figure. Since the metal fiber sheet 412 is formed with a myriad of voids 4123 between the metal fibers 4121, the pressure drop caused when the coolant flows through the pipe member 411 is small. The coolant and the pipe member 411 transfer heat to each other through not only the passage plane 4111 but also the metal fibers 4121 placed in the flow passage. Thus, the passage forming member 41 provides an excellent thermal exchange efficiency between the coolant and the heat exchange member 42, so that the temperature of the pipe member 411 is likely to promptly become equal or nearly equal to the coolant.

As shown in FIG. 3, each heat exchange member 42 is provided with a casing 421 and a latent heat storage material 422. Each casing 421 has a thin rectangular parallelepiped shape defined by a pair of wide-area surfaces and four side surfaces, and includes an internal space 4211 filled with the latent heat storage material 422. The casings 421 may be made of a high thermal conductive material, such as metal. As an alternative, for example, the casings 421 may be formed of ceramic resin or the like in a thin shape. As another alternative, the casings 421 may be made of metal and other materials in combination. As shown in FIG. 2, each casing 421 is hermetically closed in such a manner that an inlet 4212 for supplying the latent heat storage material 422 into the internal space 4211 is blocked by a stopper 4213. The position and shape of each inlet 4212 are not limited to the above-mentioned ones.

The heat storage temperature and the stored heat energy can be changed according to the constituent components and the component ratios of the latent heat storage material 422. For instance, when the latent heat storage material 422 is made of n-Pentadecane which is a n-paraffin-based latent heat storage material, the heat exchange member 42 can provide a heat storage temperature of 9.9° C. and a heat storage amount of 163.8 kJ/kg. The latent heat storage material 422 used in the present embodiment provides a heat storage temperature higher than the temperature of the coolant stored in the chiller device 120 but lower than the set temperature of the temperature control member 110.

Figure 5:
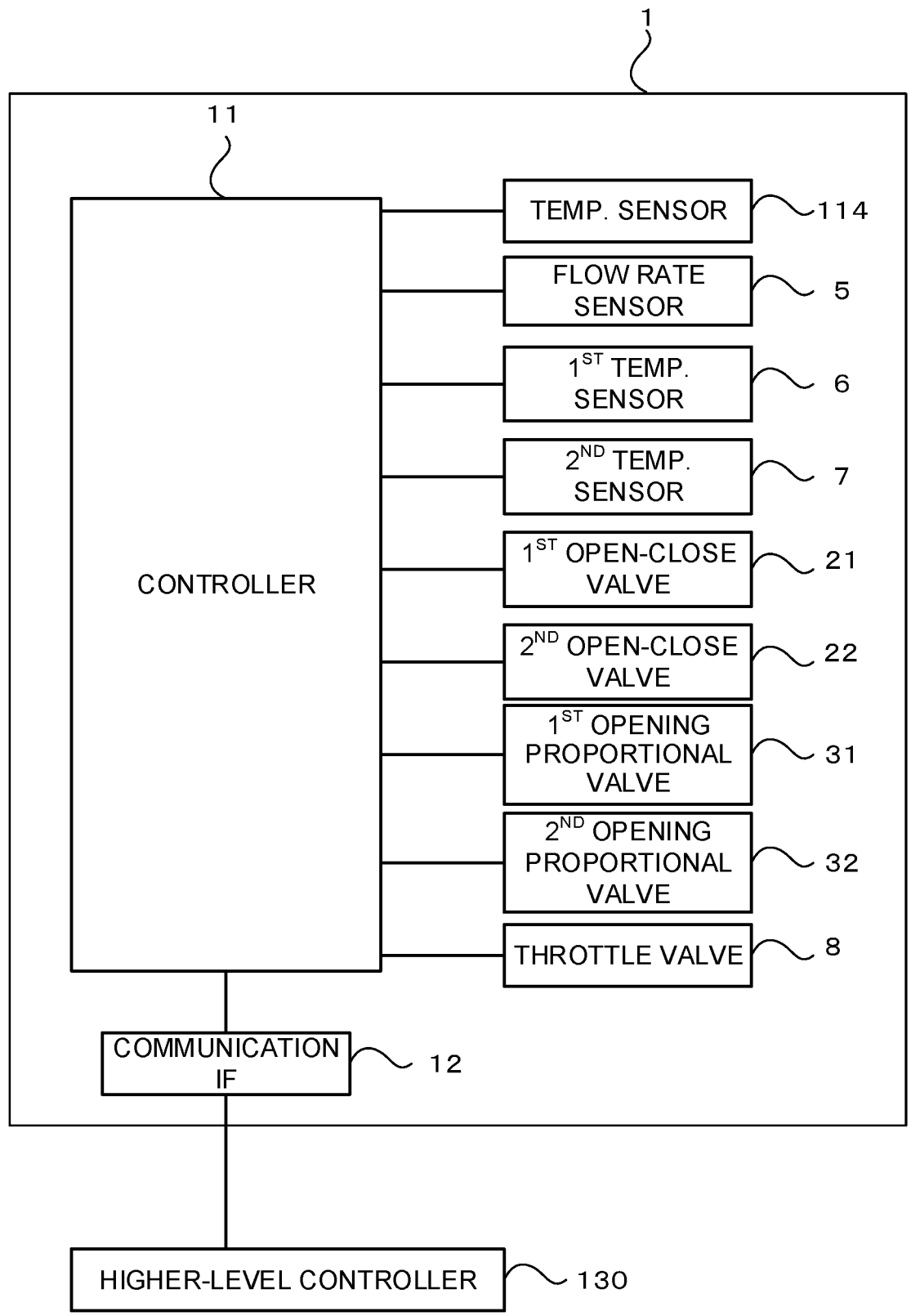
FIG. 5 is an electric block diagram of the heat exchange system.

FIG. 5 is an electric block diagram of the heat exchange system 1. The operations of the heat exchange system 1 is automatically controlled by a controller 11. The controller 11 is connected to a temperature sensor 114, the flow rate sensor 5, the first temperature sensor 6, and the second temperature sensor 7 to obtain information, such as the flow rate and the temperature of coolant. Further, the controller 11 is also connected to the first open-close valve 21 and the second open-close valve 22 of the passage switching unit 2 to supply voltage for valve opening operations and stop voltage for valve closing operations. The controller 11 causes the first open-close valve 21 and the second open-close valve 22 to relatively open and close to communicate the return line L2 with either the first branch line L21 or second branch line L22. Further, the controller 11 is connected to the first opening proportional valve 31 and the second opening proportional valve 32 of the flow distribution unit 3, and also the throttle valve 8 to output command signals to control a valve opening degree. The controller 11 is further connected to a communication interface (IF) 12. A higher-level controller 130 is connected to the controller 11 through the communication IF 12 to communicate with the controller 11, and transmits information about changes in the set temperature of the temperature control member 110, information about the temperature of the temperature control member 110, information about heat input by plasma and so on, and other information, to the controller 11.

As an alternative, the higher-level controller 130 may be configured to have all the functions of the controller 11 and the controller 11 may be omitted. As an alternative, the higher-level controller 130 may be configured to have a part of the functions of the controller 11. When the first open-close valve 21 and the second open-close valve 22 are configured to be pneumatically actuated, the controller 11 does not always supply voltage to the first open-close valve 21 and the second open-close valve 22. The command signal may be a command voltage, a command current, or a signal output through serial communication.

The operations of the heat exchange system 1 in the present embodiment will be described below. The heat exchange system 1 performs a steady driving operation and a heat exchange operation. In the present specification, the "steady driving operation" means an operation of the heat exchange system 1 to control a flow of coolant so that the latent heat storage materials 422 of the heat storage unit 4 absorb heat from the coolant and are regenerated (i.e., store the heat). In the present specification, the "heat exchange operation" means an operation of the heat exchange system 1 to control a flow of coolant so that the latent heat storage materials 422 of the heat storage unit 4 release heat to the coolant.

Figure 6:
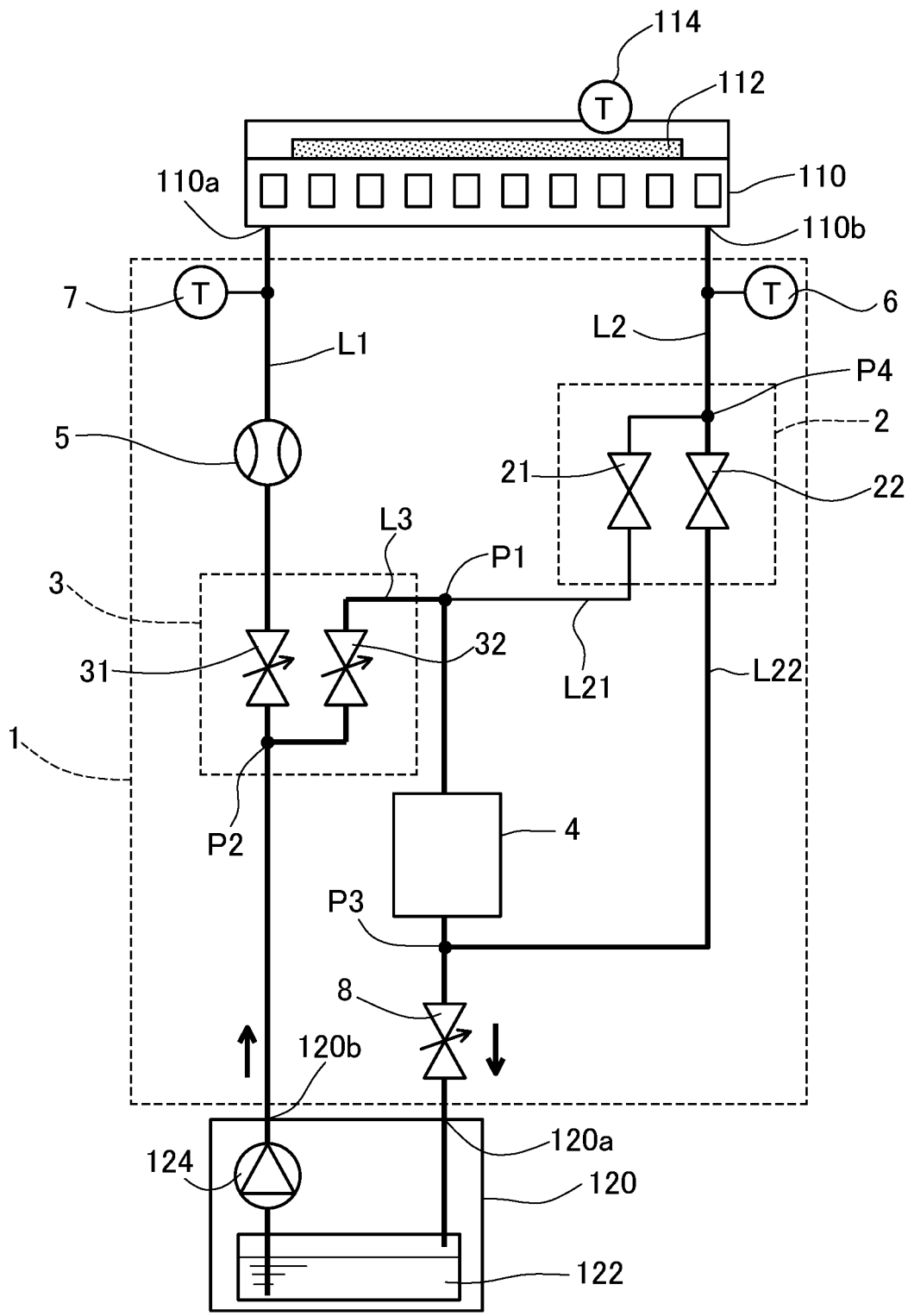
FIG. 6 is a circuit diagram to show a steady driving operation.

The steady driving operation will be described with reference to FIG. 6. The controller 11 closes the first open-close valve 21 and opens the second open-close valve 22 in the passage switching unit 2. The controller 11 obtains a difference between the temperature of the temperature control member 110 and the set temperature for example from the higher-level controller 130 and further synchronously changes the valve opening degrees of the first opening proportional valve 31 and the second opening proportional valve 32 in the flow distribution unit 3 based on the obtained difference.

For instance, for the purpose of cooling the temperature control member 110 by just that much of the heated amount by the heater 112, the controller 11 outputs a command signal representing 25% of a valve opening degree to the first opening proportional valve 31 and a command signal representing 75% of a valve opening degree to the second opening proportional valve 32. In this case, the coolant outputted from the chiller device 120 through the outlet port 120b is distributed in 25% toward the temperature control member 110 and in 75% toward the bypass line L3.

The heat exchange system 1 may also be configured for example to adjust each valve opening degree of the first opening proportional valve 31 and the second opening proportional valve 32 according to a difference between the first temperature measured by the first temperature sensor 6 and the second temperature measured by the second temperature sensor 7.

The coolant distributed from the flow distribution unit 3 to the temperature control member 110 exchanges heat with the temperature control member 110 when flowing through the temperature control member 110 heated by the heater 112. Thus, the temperature of the coolant is higher in flowing out of the output part 110b of the temperature control member 110 than in flowing in the input part 110a of the temperature control member 110. The coolant flowing out from the output part 110b then flows in the return line L2. In the passage switching unit 2 placed in the return line L2, in which the first open-close valve 21 is closed and the second open-close valve 22 is opened, the coolant flowing out from the output part 110b is caused to flow toward the second branch line L22 and return to the chiller device 120 without passing through the heat storage unit 4.

In contrast, the coolant distributed from the flow distribution unit 3 to the bypass line L3 flows in the first branch line L21 via the first connection point P1 and returns to the chiller device 120 by passing through the heat storage unit 4.

At that time, the coolant passes through the heat storage unit 4 through the voids 4123 of the metal fiber sheets 412 internally provided in the pipe members 411. The heat of the coolant is transmitted to the pipe members 411 through the passage planes 4111 and also to the metal fibers 4121 of the metal fiber sheets 412, and then transmitted to the pipe members 411 through the binding portions C1 and C2. Accordingly, the pipe members 411 and the metal fiber sheets 412 are rapidly regulated to the temperature equal or nearly equal to the temperature of the coolant. The heat exchange members 42 and the pipe members 411 are in contact with each other through their wide-area surfaces. Thus, the latent heat storage materials 422 filled in the heat exchange members 42 exchange heat, over a wider area, with the pipe members 411 through the casings 421 and hence absorb the heat of the coolant through the pipe members 411 and the metal fiber sheets 412, so that the latent heat storage materials 422 are regenerated. The heat storage unit 4 is covered with the heat insulating material 43 and therefore is less likely to cause the loss of heat release.

On the first branch line L21, the heat storage unit 4 is placed between the first connection point P1 and the third connection point P3. During the steady driving operation, therefore, the heat storage unit 4 can be supplied with the coolant outputted from the chiller device 120 in a larger amount than the coolant heated by the temperature control member 110. In the heat storage unit 4, therefore, the latent heat storage materials 422 of the heat exchange members 42 absorb heat from the cold coolant stored in the tank 122 of the chiller device 120, so that the latent heat storage materials 422 are regenerated with good efficiency. The heat storage unit 4 is regenerated by use of the coolant stored in the chiller device 120 and thus can be regenerated with energy saving.

The coolant flowing through the second branch line L22 merges with the coolant after flowing through the heat storage unit 4 at the third connection point P3, decreases in temperature, and then flows back to the chiller device 120. Therefore, even when the coolant flowing from the temperature control member 110 into the return line L2 is returned to the chiller device 120 without passing through the heat storage unit 4, the load on the chiller device 120 to cool the coolant flowing in the inlet port 120a is small.

Figure 7:
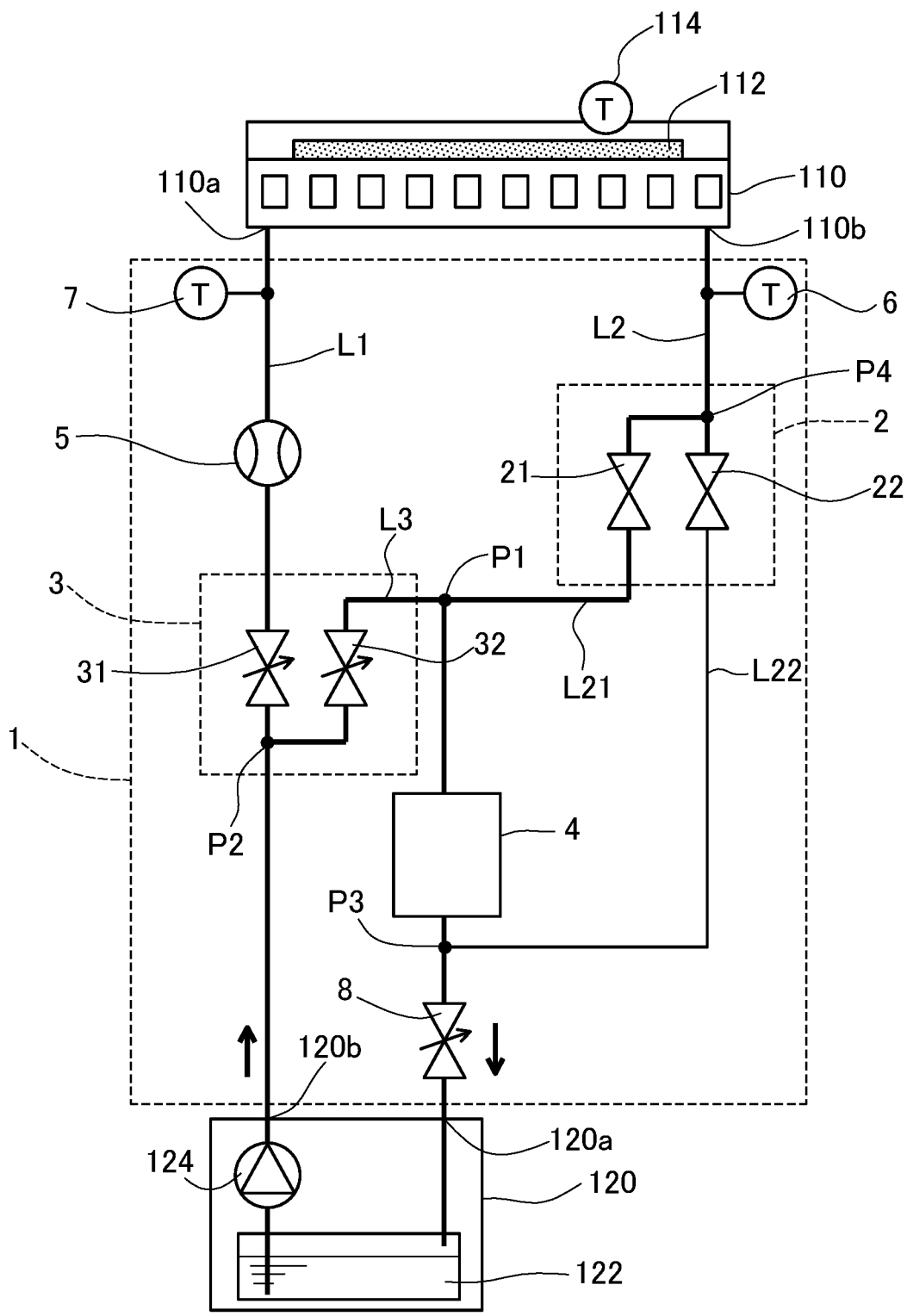
FIG. 7 is a circuit diagram to show a heat exchange operation.

The heat exchange operation will be described below with reference to FIG. 7. The controller 11 opens the first open-close valve 21 of the passage switching unit 2 and closes the second open-close valve 22 of the passage switching unit 2. The controller 11 then obtains a difference between the temperature and the set temperature of the temperature control member 110 from the higher-level controller 130, and synchronously changes the valve opening degrees of the first opening proportional valve 31 and the second opening proportional valve 32 in the flow distribution unit 3 according to the obtained difference. In this case, it is necessary to quickly decrease the temperature of the temperature control member 110 and thus the controller 11 transmits a command signal representing 95% of the valve opening degree to the first opening proportional valve 31 and a command signal representing 5% of the valve opening degree to the second opening proportional valve 32. In this case, the coolant flowing out of the chiller device 120 through the outlet port 120b is distributed in 95% toward the temperature control member 110 and in 5% toward the bypass line L3.

The coolant distributed from the flow distribution unit 3 to the temperature control member 110 flows in the return line L2 in a similar manner to that in the steady driving operation. The coolant flowing in the return line L2 is larger in flow rate and a larger amount of heat than in the steady driving operation. Since the first open-close valve 21 of the passage switching unit 2 is opened and the second open-close valve 22 of the passage switching unit 2 is closed, the coolant flowing in the return line L2 is caused to flow to the first branch line L21 and return to the chiller device 120 through the heat storage unit 4.

When the coolant is to be distributed by the flow distribution unit 3 toward the return line L2, the coolant distributed from the flow distribution unit 3 to the bypass line L3 flows in the first connection point P1 of the first branch line L21 upstream of the heat storage unit 4. Therefore, the coolant flowing from the bypass line L3 into the first branch line L21 merges with the cold coolant flowing from the first open-close valve 21 to the first connection point P1 and thus decreases in temperature before flowing in the heat storage unit 4.

The coolant flows through the passage forming members 41 of the heat storage unit 4 and then enters the inlet port 120a of the chiller device 120. The coolant flows through the voids 4123 of the metal fiber sheets 412 provided in the pipe members 411 and, in passing through the heat storage unit 4, exchanges heat with the heat exchange members 42 through the metal fibers 4121 and the pipe members 411. The pipe members 411 receive the heat of the coolant from the metal fibers 4121 through the binding portions C1 and C2 and are rapidly adjusted to the temperature equal or nearly equal to the coolant. The heat exchange member 42 transfers the heat of the latent heat storage materials 422 to the pipe members 411 through the casings 421 to cool the coolant through those pipe members 411 and metal fiber sheets 412. In this manner, the coolant can efficiently exchange heat with the latent heat storage materials 422 through the pipe members 411 and the metal fiber sheets 412 and thus be cooled quickly to the temperature equal or nearly equal to the latent heat storage materials 422. During the heat exchange operation, the heat storage unit 4 increases in heat storage temperature as it gives heat to the coolant.

In the chiller device 120, the coolant cooled to a lower temperature than the temperature of the coolant when flowing from the temperature control member 110 to the return line L2 flows in the inlet port 120a. Accordingly, even when the coolant circulates between the chiller device 120 and the temperature control member 110, the load on the chiller device 120 to cool the coolant flowing in the inlet port 120a is reduced.

The controller 11 of the heat exchange system 1 automatically switches between the steady driving operation and the heat exchange operation for example according to the amount of heat of the coolant to be returned to the chiller device 120, that is, a value obtained by multiplying the temperature of the coolant by the flow rate of the coolant returned to the chiller device 120. A concrete example of conditions for switching the operations (hereinafter, referred to as switching conditions) will be shown in FIG. 8. The heat exchange system 1 in the present embodiment is used in a unit configured to supply a coolant at a lower temperature than the set temperature of the temperature control member 110 to the temperature control member 110 to thereby regulate the temperature of the temperature control member 110. For this purpose, the controller 11 automatically switches the operations of the heat exchange system 1 for example by use of the switching conditions shown in FIG. 8A.

In FIG. 8A, the switching conditions of the controller 11 to switch from the steady driving operation to the heat exchange operation include for example a case where the controller 11 receives, from the higher-level controller 130, a set-temperature decreasing information to decrease the set temperature of the temperature control member 110 from a current value. As another example, furthermore, there is a case where the controller 11 detects a steep rise of the temperature of the temperature control member 110 based on a temperature measurement value transmitted from the temperature sensor 114. As another example, there is a case where the controller 11 receives, from the higher-level controller 130, a heat-input ON information indicating application of heat to the temperature control member 110 by plasma or the like. As still another example, there is a case where the controller 11 sets a predetermined value or more to a flow distribution ratio of the coolant flowing out of the chiller device 120 to be distributed toward the temperature control member 110.

The switching conditions under which the controller 11 switches from the heat exchange operation to the steady driving operation include for example a case where the controller 11 detects that the temperature of the temperature control member 110 is stable at the set temperature based on the temperature measurement value transmitted from the temperature sensor 114. As another example, there is a case where the controller 11 internally includes a timer for measuring timing and a set time has elapsed from the start of the heat exchange operation. As another example, there is also a case where the controller 11 sets a value less than the predetermined value to the flow distribution ratio of the coolant flowing out of the chiller device 120 to be distributed toward the temperature control member 110.

The set-temperature decreasing information may be received before the set temperature is decreased or after the set temperature is decreased. The heat-input ON information may be received before heat input or after heat input. The controller 11 may receive a detection result from the higher-level controller 130 that detects the abrupt increase in temperature and thus switch the steady driving operation to the heat exchange operation.

Operation examples in an example and a comparative example will be described below. The example is configured similarly to the heat exchange system 1 in the present embodiment. The comparative example is configured to similarly to the heat exchange system 1 in the present embodiment except that the second branch line L22, the passage switching unit 2, and the heat storage unit 4 are not provided.

Figure 9:
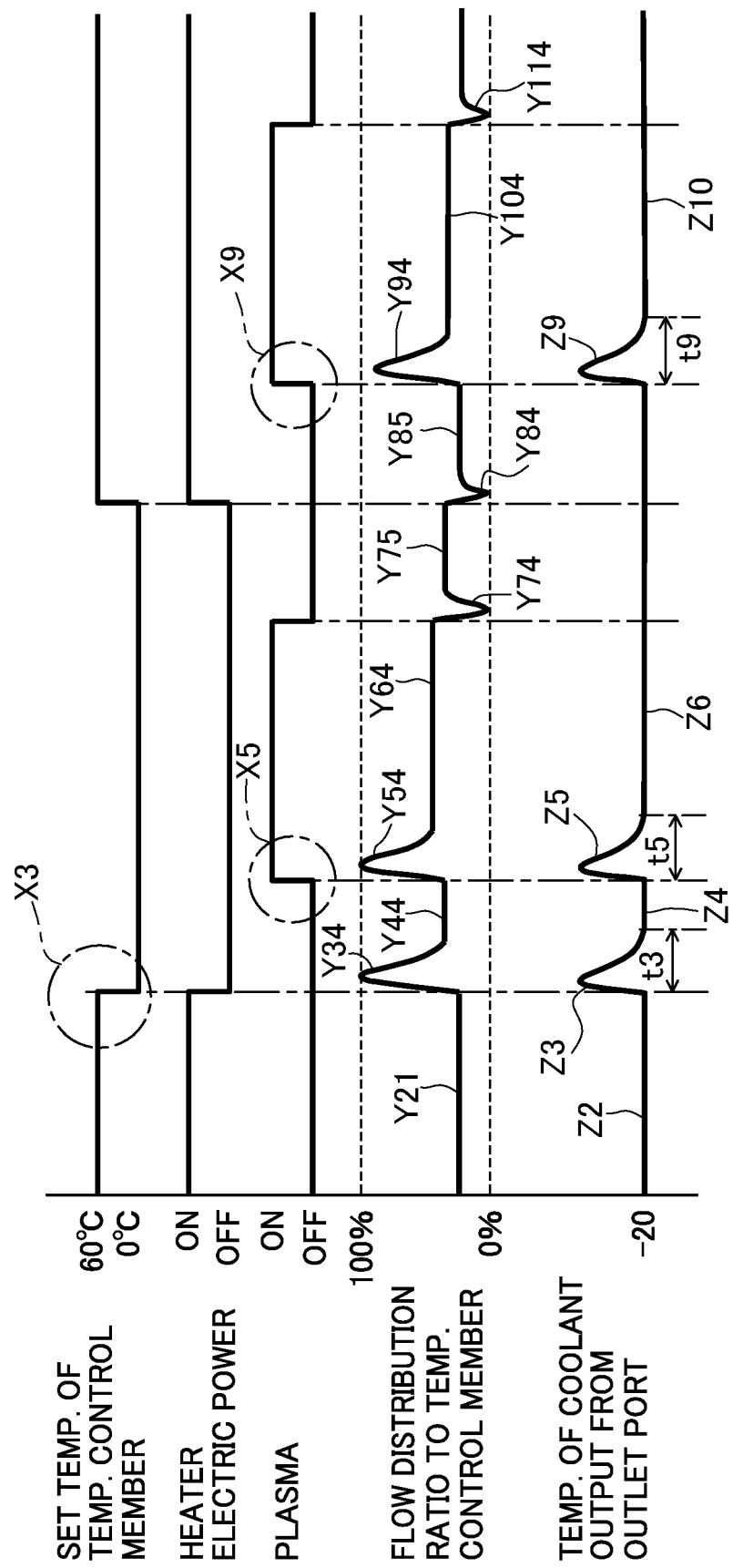
FIG. 9 is a time chart showing one example of behaviors in a comparative example and coolant temperature variation.
Figure 10:
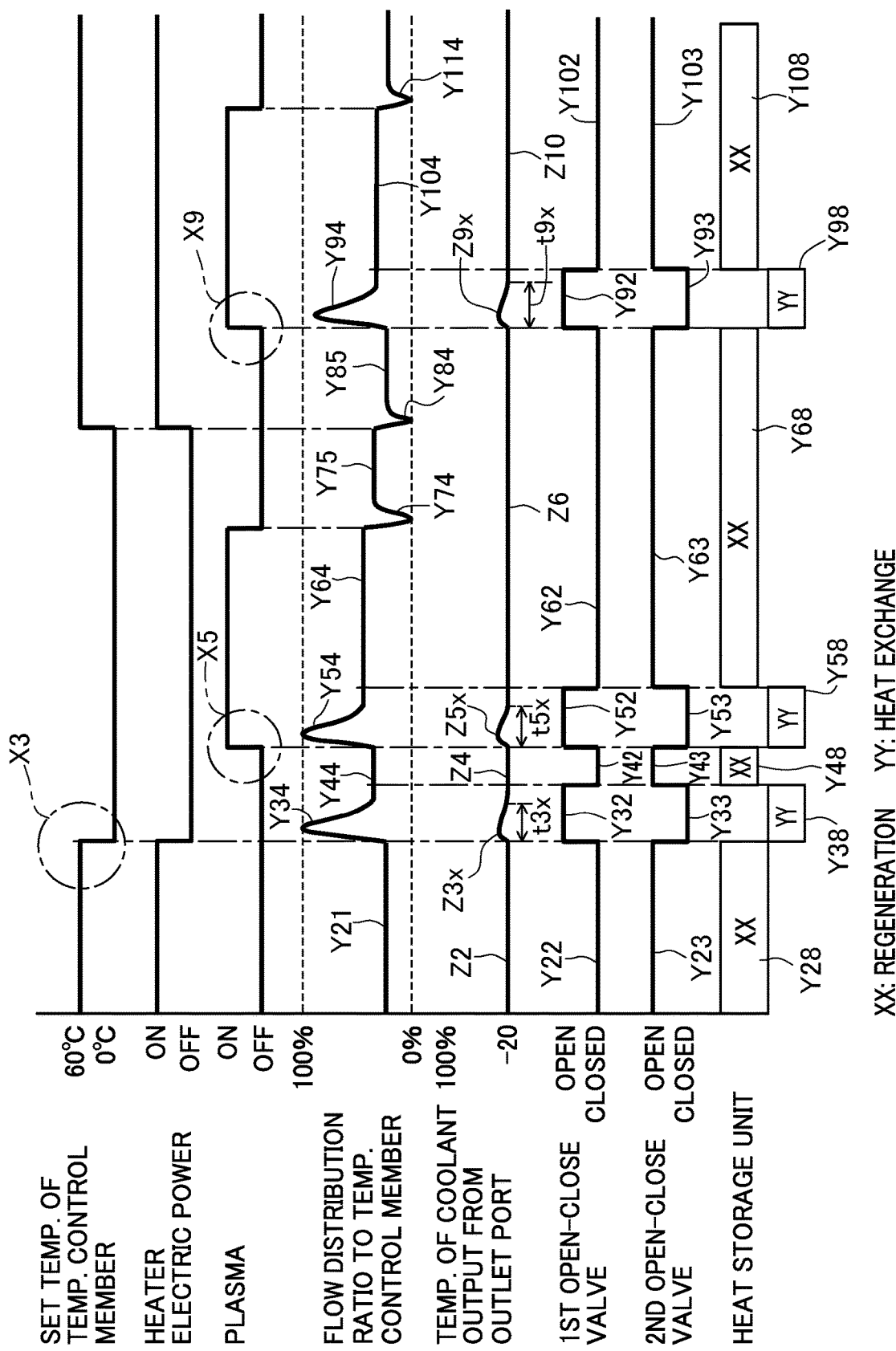
FIG. 10 is a time chart showing one example of behaviors in an example and coolant temperature variation.
Figure 11:
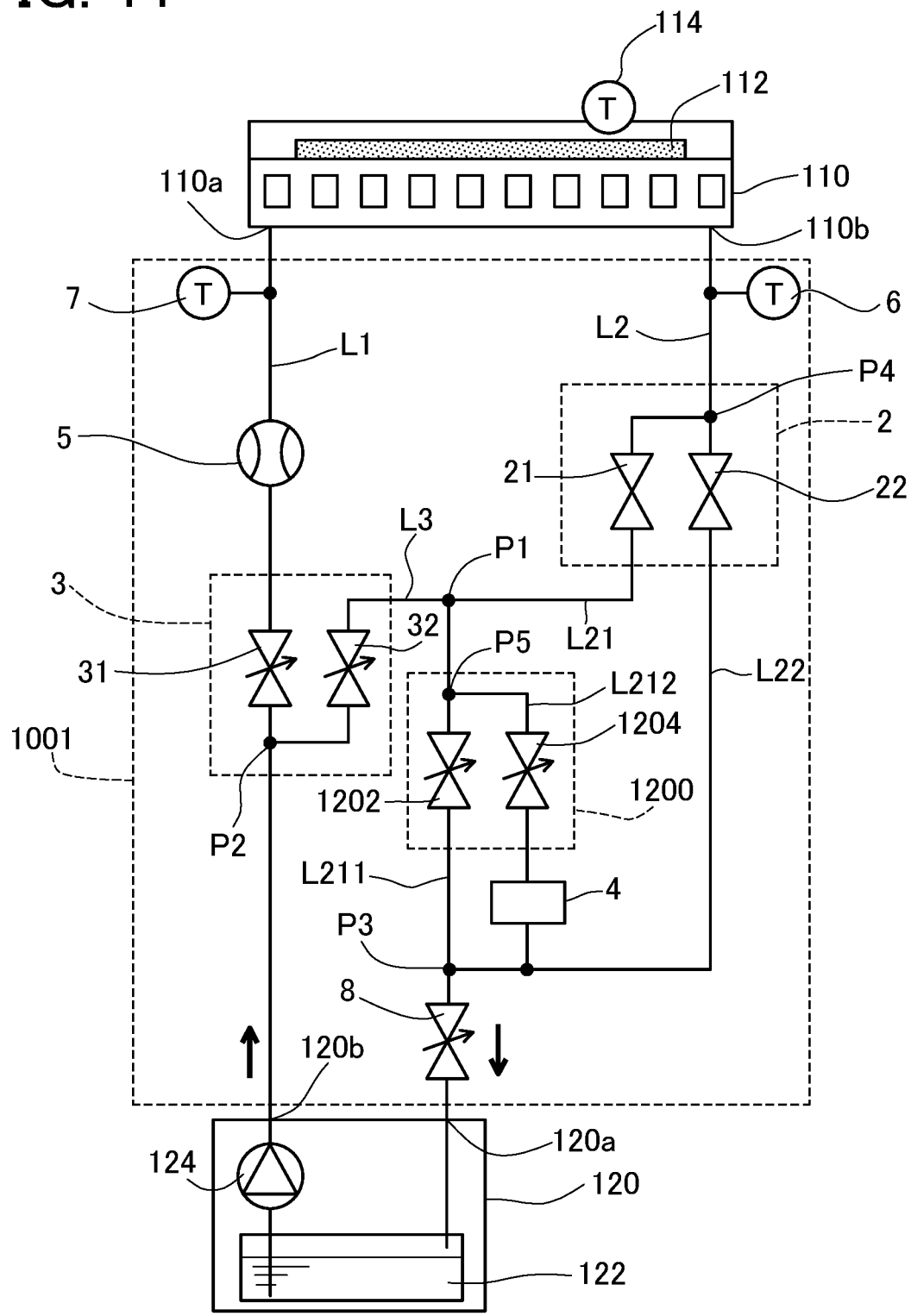
FIG. 11 is a schematic configuration diagram of a heat exchange system in a second embodiment of the present invention.

In the present operation example, the chiller device 120 is configured to store a coolant of −20° C. in the tank 122 and feed the coolant from the tank 122 to the supply line L1 at a flow rate of 35 L/min by use of the pump 124. The heat storage unit 4 in the example employs the heat exchange members 42 filled with the latent heat storage materials 422 having a heat storage temperature of −10° C. The set temperature of the temperature control member 110 is set to 60° C. or 0° C. The temperature of the temperature control member 110 is adjusted to the set temperature by the heater 112 and the coolant distributed by the flow distribution unit 3 to the temperature control member 110. When the temperature of the temperature control member 110 is stable at the set temperature, the plasma is tuned ON only for a predetermined period of time to cause an abrupt temperature increase in the temperature control member 110. Under this condition, temperature variations of the coolant flowing out of the chiller device 210 through the outlet port 120b are simulated. One example of the behaviors in the comparative example and the coolant temperature variations are shown in FIG. 9. One example of the behaviors in the example and the coolant temperature variations are shown in FIG. 10.

In the comparative example, as shown in FIG. 9, when the flow distribution ratio to the temperature control member 110 is stable, that is, when the temperature of the temperature control member 110 is stable and output values of the command signals output to the first opening proportional valve 31 are stable (Y21, Y44, Y 64, Y75, Y85, and Y104), for example, the temperature of the coolant flowing out of the chiller device 120 through the outlet port 120b is kept stable at −20° C. as indicated with Z2, Z4, Z6, and Z10 in the figure. Further, the comparative example shows that, when the flow distribution ratio to the temperature control member 110 is abruptly decreased, that is, when output values of the command signals output to the first opening proportional valve 31 (Y74, Y84, and Y114) are sharply decreased in order to increase the temperature of the temperature control member 110, the temperature of the coolant flowing out from the outlet port 120b of the chiller device 120 is also kept stable at −20° C. as indicated with Z6 and Z10 in the figure.

This is conceivably because a larger amount of the coolant is distributed toward the bypass line L3 than the coolant distributed toward the 110, so that the coolant with a small heat amount flows in the inlet port 120a of the chiller device 120, resulting in a small load applied to the chiller device 120.

In the comparative example, for example, when the set temperature of the temperature control member 110 is changed from 60° C. to 0° C., that is, the temperature control member 110 receives from the higher-level controller the information to change the set temperature from 60° C. to 0° C. (X3), or alternatively, when the temperature of the temperature control member 110 has steeply increases when plasma is turned ON, that is, the temperature control member 110 receives the heat-input information from the higher-level controller (X5 and X9), the flow distribution ratio to the temperature control member 110 is drastically increased (Y34, Y54, and Y94). Specifically, the output value of the command signal to the first opening proportional valve 31 abruptly becomes large. In this case, the temperature of the coolant flowing out from the outlet port 120b of the chiller device 120 sharply rises as indicated by Z3, Z5, and Z9 in the figure.

This is conceivably because when the flow rate of coolant subjected to heat exchange with the temperature control member 110 increases, the heat amount of the coolant flowing in the inlet port 120a of the chiller device 120 increases; however, the chiller device 120 has no chiller capacity to address such an increase in heat amount of the coolant. In a semiconductor manufacturing device, after the temperature of the coolant flowing out the chiller device 120 through the outlet port 120b becomes stable at −20° C., the subsequent treatment is performed. If peak values are large as shown in the comparative example, therefore, the semiconductor manufacturing device needs a long takt time. If the chiller device 120 is designed with a high chiller capacity, the takt time can be reduced; however, the chiller device 120 is increased in size. Since a semiconductor manufacturing device is demanded to be compact, it is unfavorable to increase the size of the chiller device 120. When the plasma energy becomes large, the chiller capacity of the chiller device 120 is not sufficient, which will cause the same problems as above.

In the example, in contrast, as shown in FIG. 10, when the flow distribution ratio to the temperature control member 110 is stable (Y21, Y44, Y64, Y75, Y85, and Y104), or alternatively, when the flow distribution ratio to the temperature control member 110 abruptly decreases (Y74, Y84, and Y114), the first open-close valve 21 is closed and the second open-close valve 22 is opened to perform the steady driving operation (Y22, Y23, Y42, Y43, Y62, Y63, Y102, and Y103). During the steady driving operation, the latent heat storage materials 422 of the heat storage unit 4 are regenerated by the coolant flowing out of the chiller device 120 through the outlet port 120b (Y28, Y48, Y68, and Y108). During the steady driving operation, the temperature of the coolant flowing out of the chiller device 120 through the outlet port 120b is stable at −20° C. (Z2, Z4, Z6, and Z10).

The coolant flowing through the heat storage unit 4 exchanges heat with the latent heat storage materials 422, so that the temperature of the coolant is higher than the temperature when flowing out from the outlet port 120b of the chiller device 120. However, the heat storage temperature of the latent heat storage materials 422 is −10° C. and thus the coolant after flowing through the heat storage unit 4 has a smaller temperature difference from the coolant to be outputted from the outlet port 120b than the coolant after flowing through the temperature control member 110. Thus, the chiller device 120 can sufficiently regenerate the heat storage unit 4 by a chiller capacity required to cool the coolant after flowing through the temperature control member 110.

In the example, when the set temperature of the temperature control member 110 is changed from 60° C. to 0° C. (X3) or alternatively when the temperature of the temperature control member 110 steeply rises when plasma is turned ON, the first open-close valve 21 is switched from a valve closed state to a valve open state and the second open-close valve 22 is switched from a valve open state to a valve closed state, so that the steady driving operation is automatically switched to the heat exchange operation (Y32, Y33, Y52, Y53, Y92, and Y93). The flow distribution unit 3 operates to increase the flow rate of coolant to be supplied to the temperature control member 110 in order to decrease the temperature of the temperature control member 110 (Y34, Y54, and Y94). Accordingly, as indicated by Z3x, Z5x, and Z9x in the figure, the temperature of the coolant flowing out of the chiller device 120 through the outlet port 120b rises, but its peak value is smaller than that in the comparative example.

The coolant flowing from the temperature control member 110 into the return line L2 increases in flow rate than during the steady driving operation and thus increases the heat amount as in the comparative example. However, the coolant is returned to the chiller device 120 after the temperature of the coolant is decreased by heat exchange with the latent heat storage materials 422 of the heat storage unit 4. Therefore, in the chiller device 120, the coolant flowing in the inlet port 120a has a smaller heat amount than that in the comparative example. The example therefore can facilitate cooling the coolant flowing in the inlet port 120a of the chiller device 120 close to −20° C. and reduce the peak value of the temperature of the coolant flowing out from the outlet port 120b than the comparative example. Further, the example can reduce the time (t3x, t5x, and t9x in the figure) required to stabilize the temperature of the coolant when the peak value occurs than the time (t3, t5, and t9) in the comparative example. Thus, the semiconductor manufacturing device using the example can reduce the tact time than the semiconductor manufacturing device using the comparative example. Since the chiller device 120 does not need to be increased in size to change a chiller capacity, the size of the semiconductor manufacturing device can be maintained. Even when the plasma energy is increased, the latent heat storage materials 422 of the heat storage unit 4 have only to be replaced, so that the chiller device 120 does not need to be replaced with another one.

After the heat exchange operation, the heat exchange system 1 is automatically switched to the steady driving operation. Thus, the stored heat energy of the heat storage unit 4, which has been lost during the heat exchange operation, is automatically restored by use of the heat of the coolant in the steady driving operation. Consequently, the heat exchange system 1 can continuously reduce the load applied to the chiller device 120 with energy saving.

The heat exchange system 1 in the present embodiment described above is configured to utilize the heat energy of the heat storage unit 4 or merge the coolant to be supplied from the chiller device 120 to the temperature control member 110 with the coolant to be returned from the temperature control member 110 to the chiller device 120. This configuration can reduce a temperature difference between the coolant to be returned from the temperature control member 110 to the chiller device 120 and the coolant stored in the chiller device 120, so that the load applied to the chiller device 120 can be reduced. As an adventitious effect, because the load applied to the chiller device 120 is reduced, the chiller device 120 may have a low chiller capacity to the temperature of coolant flowing out of the temperature control member 110. Thus, a compact chiller device can be used as the chiller device 120.

The heat exchange system 1 causes the coolant supplied from the chiller device 120 to flow to the bypass line L3 for example by use of the flow distribution unit 3 and thus can regenerate the heat storage unit 4 by the heat of the coolant. Accordingly, the heat exchange system 1 can reduce the load applied to the chiller device 120 with energy saving.

In addition, the heat exchange system 1 is configured such that the return line L2 branches into the first branch line L21 and the second branch line L22 to allow the fluid returned from the temperature control member 110 to return to the chiller device 120 without passing through the heat storage unit 4 when the heat storage unit 4 is to be regenerated. This configuration can efficiently regenerate the heat storage unit 4.

In the heat exchange system 1, the coolant exchanges heat with the heat exchange members 42 when the coolant flows through the pipe members 411. The heat exchange efficiency between the coolant and the heat exchange members 42 can be enhanced. The coolant flows through the pipe members 411 by passing through the voids 4123 of the metal fiber sheets 412 while exchanging heat with the heat exchange members 42 through the metal fiber sheets 412 and the pipe members 411. Thus, the heat exchange system 1 can enhance the heat exchange efficiency between the coolant and the heat exchange members 42 while reducing the pressure loss caused when the coolant flows through the heat storage unit 4. Furthermore, the pipe members 411 and the heat exchange members 42 each have a thin rectangular parallelepiped shape and are stacked on top of each other. This configuration can provide a sufficient flow rate of a thermal medium and also enhance the heat exchange efficiency between the pipe members 411 and the corresponding heat exchange members 42.

The chiller device 120 may store for example a high-temperature medium that has a higher temperature than the set temperature of the temperature control member 110, instead of the coolant, so that the high-temperature medium circulates through the temperature control member 110 to heat the temperature control member 110. In this case, such a heat exchange system 1 may be fabricated as long as the heat exchange members 42 of the heat storage unit 4 are replaced with ones adaptable to high temperature without changing a circuit configuration. For instance, when the temperature of the high-temperature medium is 90° C., a heat exchange member whose heat storage temperature is 80° C. may be employed instead. In this case, the heat exchange system 1 can also perform the steady driving operation as in the case of using the aforesaid coolant and thus efficiently regenerate the heat storage unit 4 by heat release of the high-temperature medium. Specifically, the heat storage unit 4 absorbs the heat from the high-temperature medium to increase the heat storage temperature. In contrast, the high-temperature medium loses heat to the heat storage unit 4 and decreases in temperature. Furthermore, when the heat exchange system 1 performs the heat exchange operation in a similar manner to the above, the heat storage unit 4 can warm the high-temperature medium whose temperature has been decreased by heat release or the like of the temperature control member 110 and the pipe parts, so that the heated medium returns to the chiller device 120. This heat exchange system 1 can thus reduce the load applied to the chiller device 120. In other words, the heat storage unit 4 gives heat to the high-temperature medium, decreasing the heat storage temperature. In contrast, the high-temperature medium is given the heat from the heat storage unit 4, increasing the temperature.

In this case, the controller 11 is used in a unit that supplies the high-temperature medium having a higher temperature than the set temperature of the temperature control member 110 to regulate the temperature of the temperature control member 110. Therefore, the controller 11 automatically switches the operation of the heat exchange system 1 for example by use of the switching conditions shown in FIG. 8B.

In FIG. 8B, the switching conditions under which the controller 11 switches the steady driving operation to the heat exchange operation includes for example a case where the controller 11 receives, from the higher-level controller 130, the set-temperature increasing information to increase the set temperature of the temperature control member 110 from a current value. As another example, there is a case where the controller 11 detects a steep drop of the temperature of the temperature control member 110 based on a temperature measurement value transmitted from the temperature sensor 114. As another example, there is a case where the controller 11 receives heat-input OFF information from the higher-level controller 130. As still another example, there is a case where the controller 11 sets a value less than the predetermined value to the flow distribution ratio of the coolant outputted from the chiller device 120 to be distributed by the flow distribution unit 3 to the temperature control member 110.

The switching conditions under which the controller 11 switches the heat exchange operation to the steady driving operation includes for example a case where the controller 11 detects that the temperature of the temperature control member 110 is stable at the set temperature based on a temperature measurement value transmitted from the temperature sensor 114. As another example, there is a case where the controller 11 internally includes a timer for measuring timing and a set time has elapsed from the start of the heat exchange operation. As still another example, there is a case where the controller 11 sets the predetermined value or more to the flow distribution ratio of the coolant flowing out of the chiller device 120 to be distributed to the temperature control member 110.

The set-temperature increasing information may be received before the set temperature increases or after the set temperature increases. The heat-input OFF information may be received before heat input is stopped or after heat input is stopped.

Second Embodiment

Next, a second embodiment of the present invention will be described. FIG. controller 11 is a schematic configuration diagram of a heat exchange system 1001 in the second embodiment of the present invention. The heat exchange system 1001 in the second embodiment is different from the first embodiment in that the first branch line L21 further divides into branches to be switched by a passage switching unit passage switching unit 1200. The following description is given to differences from the first embodiment. Similar parts to those in the first embodiment are assigned the same reference signs in the figures as those in the first embodiment and their details are appropriately omitted.

The first branch line L21 in the heat exchange system 1001 branches into a third branch line L211 and a fourth branch line L212 at a branch point P5 provided closer to the chiller device 120 relative to the first connection point P1, i.e., provided more downstream than the first connection point P1. The third branch line L211 communicates with the chiller device 120. The throttle valve 8 is placed on the third branch line L211. The fourth branch line L212 connects to the second branch line L22. On this fourth branch line L212, the heat storage unit 4 is placed.

At the branch point P5, the passage switching unit 1200 is placed. This passage switching unit 1200 is provided with a first open-close valve 1202 and a second open-close valve 1204. The first open-close valve 1202 is placed on the third branch line L211 and the second open-close valve 1204 is placed on the fourth branch line L212. The passage switching unit 1200 switches the flow passage of the coolant flowing from the chiller device 120 into the first branch line L21 through the flow distribution unit 3. The passage switching unit 1200 is one example of a "second flow distribution unit".

The operations of the heat exchange system 1001 will be described below with reference to FIGS. 12 to 14.

Figure 12:
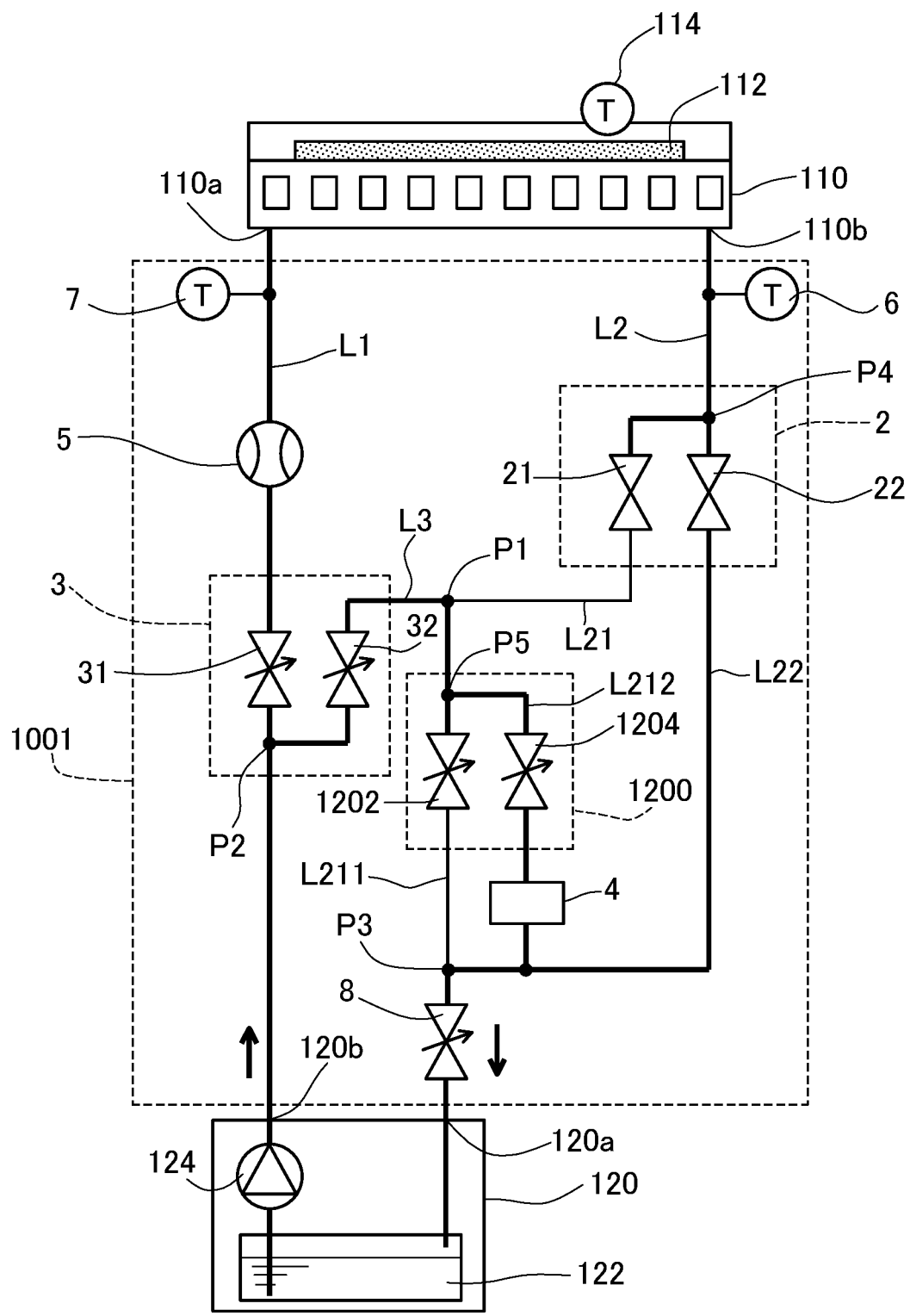
FIG. 12 is a diagram to show a regeneration operation.
Figure 13:
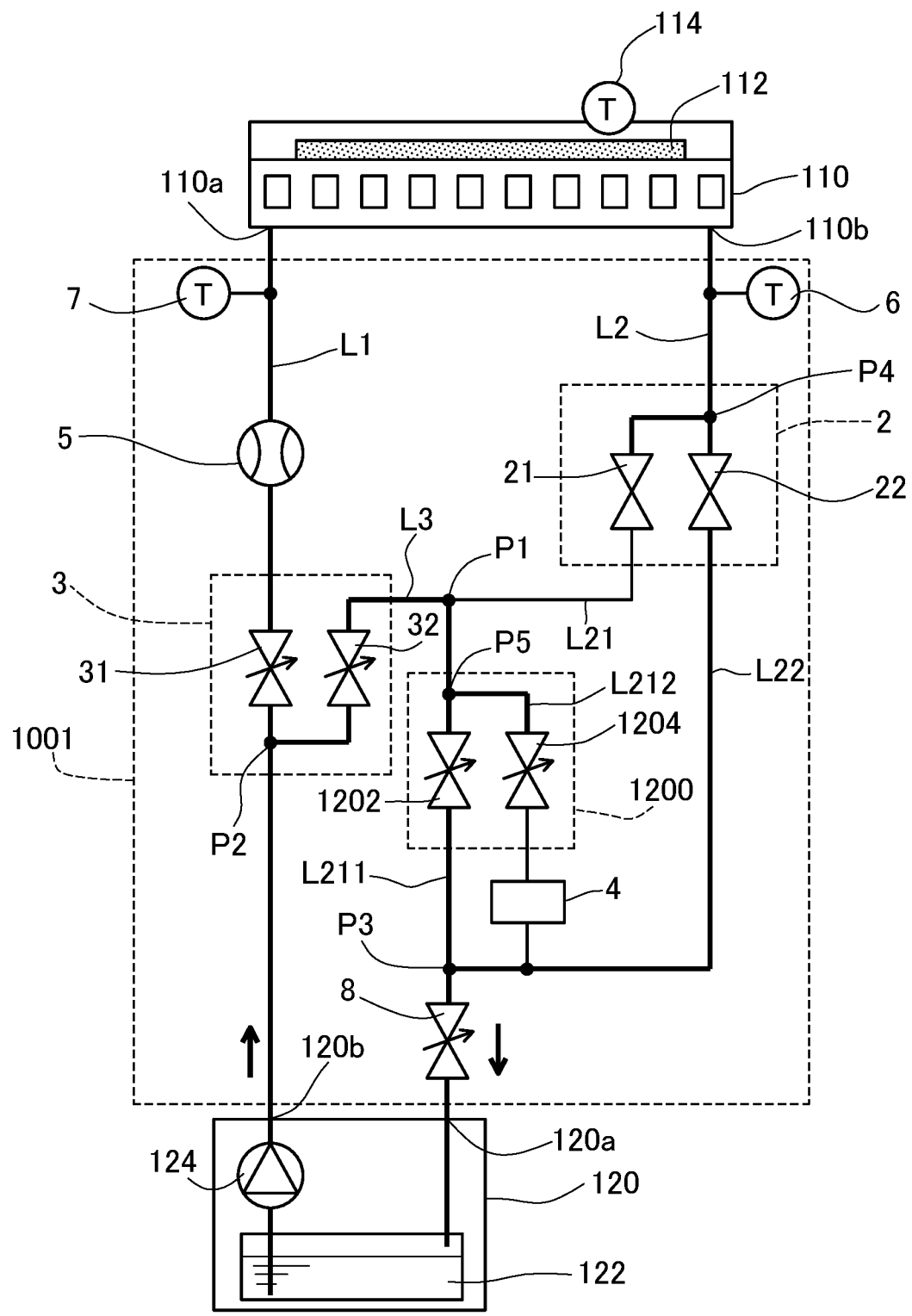
FIG. 13 is a diagram to show a non-use operation.
Figure 14:
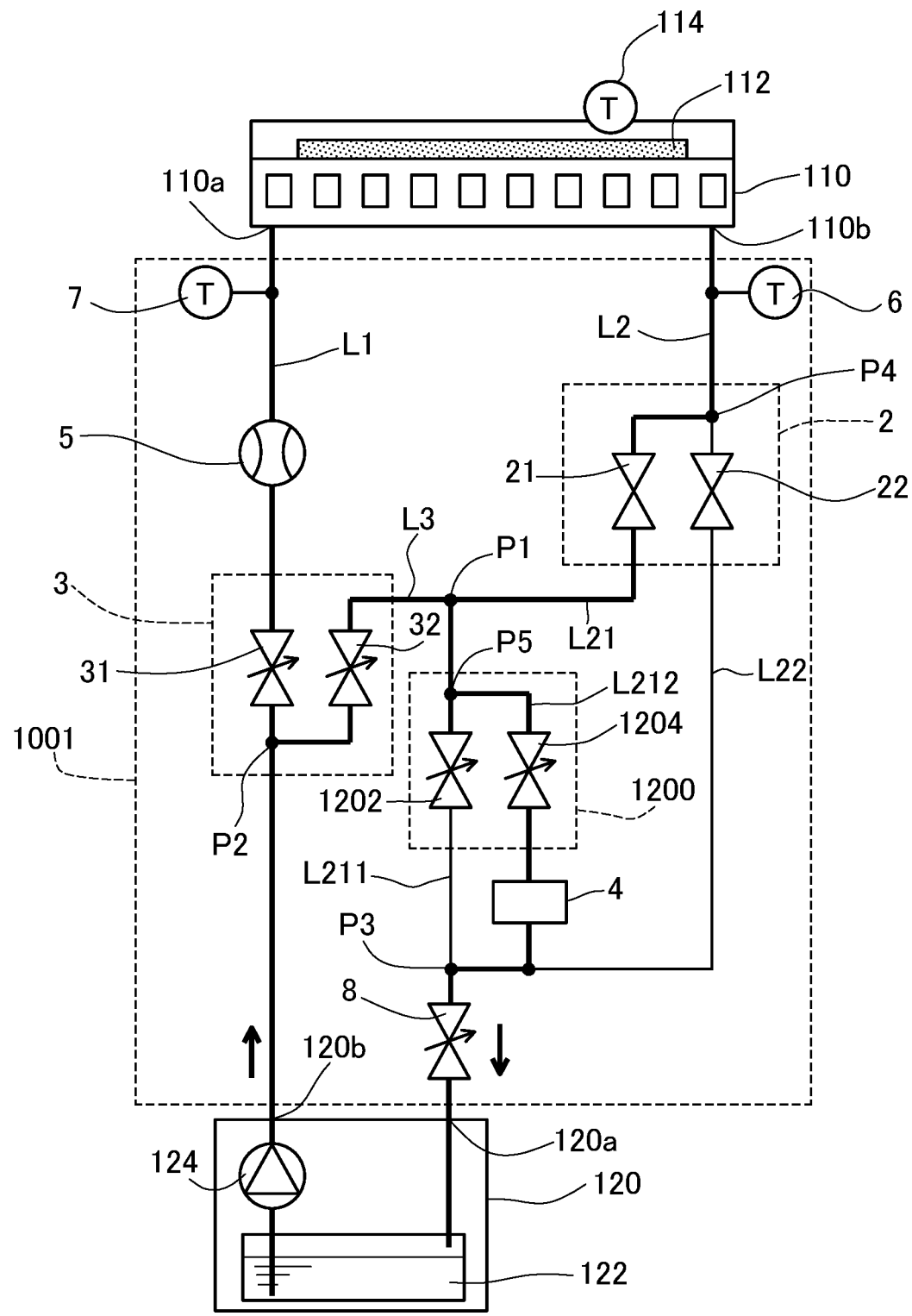
FIG. 14 is a diagram to show a heat exchange operation.

The 1001 is configured to perform a regeneration operation shown in FIG. 12, a non-use operation shown in FIG. 13, and a heat exchange operation shown in FIG. 14. In this specification, the "regeneration operation" means an operation to regenerate the latent heat storage materials 422 of the heat storage unit 4 by use of the coolant flowing out of the chiller device 120. In the present specification, furthermore, the "non-use operation" means an operation without use of the heat storage unit 4.

For execution of the regeneration operation, as shown in FIG. 12, the controller 11 of the heat exchange system 1001 opens the second open-close valve 22 of the passage switching unit 2 and the second open-close valve 1204 of the passage switching unit 1200 while closes the first open-close valve 21 of the passage switching unit 2 and the first open-close valve 1202 of the passage switching unit 1200. The controller 11 operates the flow distribution unit 3 so as to stabilize the temperature of the temperature control member 110 at the set temperature.

Since the first open-close valve 21 is closed and the second open-close valve 22 is opened in the passage switching unit 2, the coolant distributed from the flow distribution unit 3 to the temperature control member 110 exchanges heat with the temperature control member 110 and then flows in the return line L2 and the second branch line L22, and returns to the chiller device 120 without passing through the heat storage unit 4.

Because the first open-close valve 1202 is closed and the second open-close valve 1204 is opened in the passage switching unit 1200, the coolant distributed from the flow distribution unit 3 to the bypass line L3 flows to the fourth branch line L212. Thus, the coolant returns to the chiller device 120 by passing through the heat storage unit 4. At that time, the heat exchange members 42 of the heat storage unit 4 exchange heat with the coolant flowing through the passage forming members 41, so that the heat exchange members 42 are regenerated.

For execution of the non-use operation, as shown in FIG. 13, the controller 11 of the heat exchange system 1001 opens the second open-close valve 22 of the passage switching unit 2 and the first open-close valve 1202 of the passage switching unit 1200 while closes the first open-close valve 21 of the passage switching unit 2 and the second open-close valve 1204 of the passage switching unit 1200. The heat exchange system 1001 regulates the flow rate of coolant to be distributed from the flow distribution unit 3 to the temperature control member 110 and the bypass line L3 to stabilize the temperature of the temperature control member 110. The coolant supplied from the flow distribution unit 3 to the temperature control member 110 returns to the chiller device 120 in a similar manner to that in the regeneration operation.

Because the second open-close valve 1204 is closed and the first open-close valve 1202 is opened in the passage switching unit 1200, the coolant supplied from the flow distribution unit 3 to the bypass line L3 flows in the third branch line L211. Thus, the coolant returns to the chiller device 120 without exchanging heat with the heat exchange member 42 of the heat storage unit 4 while the coolant has the temperature unchanged from when flowing out of the chiller device 120.

In contrast, for execution of the heat exchange operation, as shown in FIG. 14, the heat exchange system 1001 opens the first open-close valve 21 of the passage switching unit 2 and the second open-close valve 1204 of the passage switching unit 1200 while closes the second open-close valve 22 of the passage switching unit 2 and the first open-close valve 1202 of the passage switching unit 1200. The flow distribution unit 3 is operated to increase the flow rate of the coolant to be supplied to the temperature control member 110.

Since the second open-close valve 22 is closed and the first open-close valve 21 is opened in the passage switching unit 2, the coolant supplied from the flow distribution unit 3 to the temperature control member 110 cools the temperature control member 110 and then flows to the return line L2 and the first branch line L21. Since the first open-close valve 1202 is closed and the second open-close valve 1204 is opened in the passage switching unit 1200, the coolant flows in the fourth branch line L212 and then returns to the chiller device 120 via the heat storage unit 4.

The coolant flowing through the heat storage unit 4 exchanges heat with the heat exchange members 42 while flowing through the passage forming members 41. Accordingly, the coolant cooled to the temperature equal or nearly equal to the temperature of the heat exchange members 42 returns to the chiller device 120. This reduces the load applied to the chiller device 120 to cool the coolant.

Herein, the controller 11 switches the operation of the heat exchange system 1001 according to the following switching conditions. Specifically, the controller 11 automatically switches the heat exchange operation to the regeneration operation or the non-use operation according to any one of the switching conditions for switching the heat exchange operation to the steady driving operation shown in FIG. 8A. Further, the controller 11 automatically switches the regeneration operation or the non-use operation to the heat exchange operation according to any one of the switching conditions for switching the steady driving operation to the heat exchange operation shown in FIG. 8A.

Furthermore, for instance, the controller 11 executes the regeneration operation when the heat amount of the heat storage unit 4 is less than a predetermined heat amount and executes the non-use operation when the heat amount of the heat storage unit 4 is the predetermined heat amount or more. For example, the controller 11 may switch between the non-use operation and the regeneration operation with time.

As described above, the heat exchange system 1001 in the present embodiment can switch the flow passage by use of the passage switching unit 1200 as needed to regenerate the heat storage unit 4. This system can therefore avoid unnecessary regeneration of the heat storage unit 4 and hence enhance the energy saving efficiency.

In the foregoing description, the passage switching unit 1200 supplies all the coolant flowing from the bypass line L3 to the first branch line L21 to any of the third branch line L211 and the fourth branch line L212 of the first branch line L21 by use of the first open-close valve 1202 and the second open-close valve 1204. As an alternative, for example, the passage switching unit 1200 may be configured as a flow distribution unit as with the flow distribution unit 3. Specifically, it may be configured such that a first opening proportional valve is placed in the third branch line L211 and a second opening proportional valve is placed in the fourth branch line L212 to distribute the coolant flowing from the bypass line L3 into the first branch line L21 to the third branch line L211 and the fourth branch line L212. In this case, the heat exchange system 1001 can flow the coolant through the heat storage unit 4 at a flow rate appropriate for the heat storage amount of the heat storage unit 4 to perform the regenerate operation, and therefore can avoid any unnecessary regeneration operation.

Third Embodiment

Figure 15:
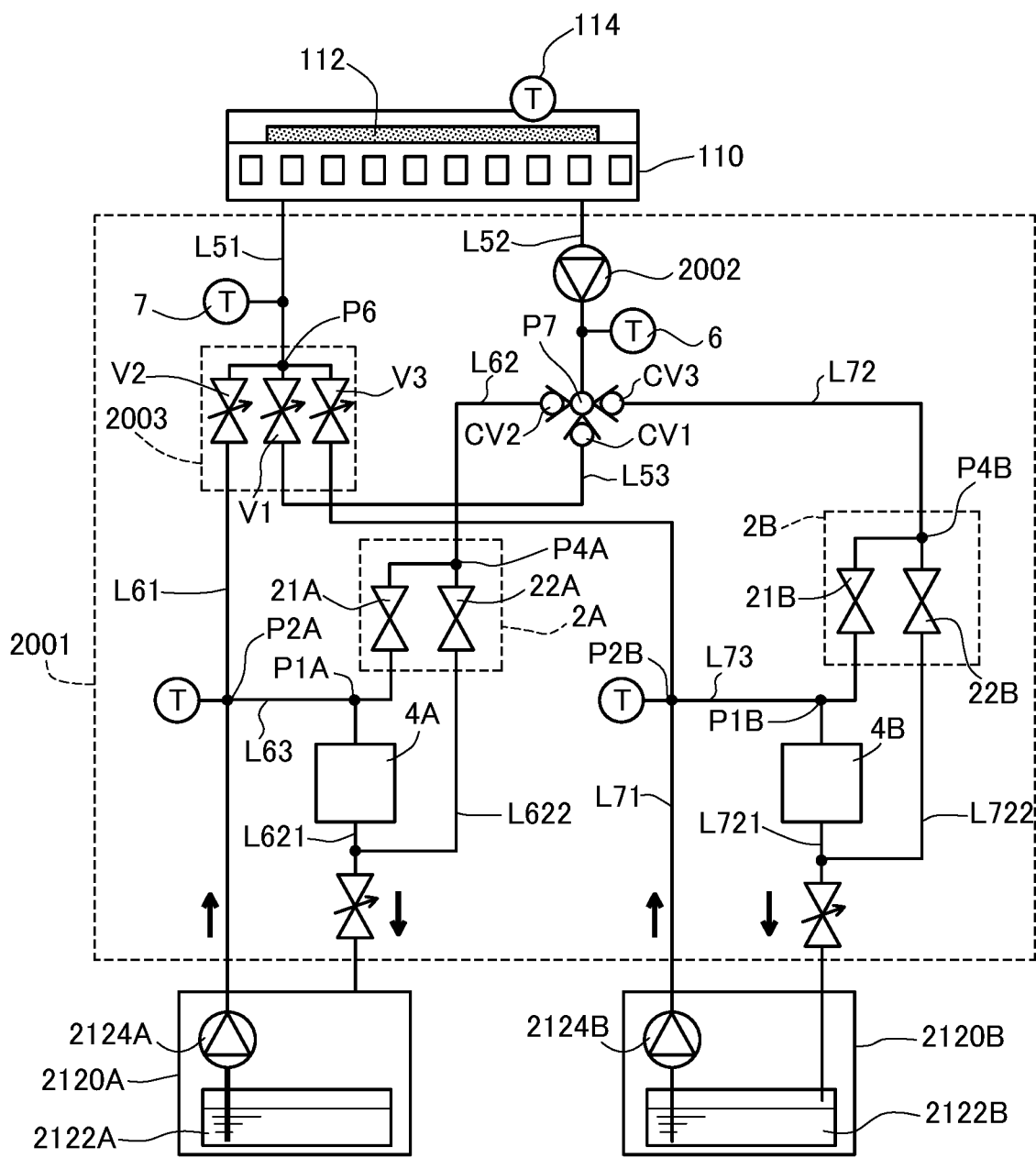
FIG. 15 is a schematic configuration diagram of a heat exchange system in a third embodiment of the present invention.

Next, a heat exchange system according to a third embodiment of the present invention will be described. FIG. 15 is a schematic configuration diagram of a heat exchange system 2001 in the third embodiment of the present invention. The heat exchange system 2001 is provided on a circulation path for circulating a temperature-regulating fluid between the temperature control member 110 and a chiller device 2120A for low temperature (a low-temperature chiller device) and a chiller device 2120B for high temperature (a high-temperature chiller device). The temperature-regulating fluid is one example of a "thermal medium". Different from the first embodiment, the heat exchange system 2001 includes two different types of heat storage units, i.e., a heat storage unit 4A for low temperature (a low-temperature heat storage unit) and a heat storage unit 4B for high temperature (a high-temperature heat storage unit), which are different in heat storage temperature. The low-temperature chiller device 2120A is one example of a "first chiller device". The high-temperature chiller device 2120B is one example of a "second chiller device".

The temperature of the temperature control member 110 is adjusted by the heater 112 and the temperature-regulating fluid. The heater 112 may be dispensed with.

The low-temperature chiller device 2120A stores, in a low-temperature tank 2122A, a low-temperature fluid whose temperature is lower than the temperature-regulating fluid circulating through the temperature control member 110, and feeds out the low-temperature fluid to the temperature control member 110 by use of a low-temperature pump 2124A. The high-temperature chiller device 2120B stores, in a high-temperature tank 2122B, a high-temperature fluid whose temperature is higher than the low-temperature fluid and the temperature-regulating fluid circulating through the temperature control member 110, and feeds the high-temperature fluid to the temperature control member 110 by use of a high-temperature pump 2124B. In the present embodiment, the low-temperature chiller device 2120A adjusts the temperature of the low-temperature fluid to −20° C. and the high-temperature chiller device 2120B adjusts the temperature of the high-temperature fluid to 90° C. The low-temperature fluid and the high-temperature fluid are one example of a "thermal medium". The low-temperature fluid is one example of a "first thermal medium" and the high-temperature fluid is one example of a "second thermal medium".

The heat exchange system 2001 includes an output line L51, an input line L52, a connection line L53, a low-temperature fluid supply line L61, a return line low-temperature fluid L62, a low-temperature fluid bypass line L63, a high-temperature fluid supply line L71, a high-temperature fluid return line L72, and a high-temperature fluid bypass line L73. The low-temperature fluid supply line L61 is one example of the supply line and the first supply line. The low-temperature fluid return line L62 is one example of the return line and the first return line. The low-temperature bypass line low-temperature fluid bypass line L63 is one example of the bypass line and the first bypass line. The high-temperature fluid supply line L71 is one example of the supply line and the second supply line. The high-temperature fluid return line L72 is one example of the return line and the second return line. The high-temperature bypass line L73 is one example of the bypass line and the second bypass line. The output line L51, the input line input line L52, and the connection line L53 are one example of the main circulation circuit.

The output line L51 supplies the temperature-regulating fluid to the temperature control member 110. The input line L52 receives the temperature-regulating fluid from the temperature control member 110. The connection line L53 connects the output line L51 and the input line L52. In the input line L52, the circulation pump 2002 is placed. The temperature-regulating fluid is allowed to circulate with a constant flow rate by a pump operation of the circulation pump 2002 between the temperature control member 110 and the heat exchange system 2001 through the output line L51, the input line input line L52, and the connection line L53. The circulation pump 2002 may be installed outside the heat exchange system 2001.

The low-temperature fluid supply line L61 connects the low-temperature chiller device 2120A with the output line L51 to supply the low-temperature fluid from the low-temperature chiller device 2120A to the temperature control member 110. The low-temperature fluid return line L62 connects the input line L52 with the low-temperature chiller device 2120A to return the temperature-regulating fluid to the low-temperature chiller device 2120A. The low-temperature fluid return line L62 branches at a branch point P4A, as in the first embodiment, into a low-temperature fluid first branch line L621 and a low-temperature fluid second branch line L622. At the branch point P4A, a low-temperature passage switching unit 2A is provided as in the first embodiment. The low-temperature fluid supply line L61 and the low-temperature fluid first branch line L621 connect to each other through the low-temperature fluid bypass line L63 as in the first embodiment. On the low-temperature fluid first branch line L621, a low-temperature heat storage unit 4A is placed at a position closer to the low-temperature chiller device 2120A relative to the connection point P1A for connection to the low-temperature fluid bypass line L63. The low-temperature heat storage unit 4A in the present embodiment employs the heat exchange members 42 whose heat storage temperature is −10° C.

The high-temperature fluid supply line L71 connects the high-temperature chiller device 2120B with and the output line L51 to supply the high-temperature fluid from the high-temperature chiller device 2120B to the temperature control member 110. The high-temperature return line L72 connects the input line L52 with the high-temperature chiller device 2120B to return the temperature-regulating fluid to the high-temperature chiller device 2120B. The high-temperature fluid return line L72 branches at a branch point P4B as in the first embodiment into a first branch line L721 for high-temperature fluid and a second branch line L722 for high-temperature fluid. At the branch point P4B, a high-temperature passage switching unit 2B is provided as in the first embodiment. The high-temperature fluid supply line L71 and the first branch line L721 for high-temperature fluid connect to each other through the high-temperature bypass line L73 as in the first embodiment. On the high-temperature first branch line L721, a high-temperature heat storage unit 4B is placed at a position closer to the high-temperature chiller device 2120B relative to the connection point P1B for connection to the high-temperature bypass line L73. The high-temperature heat storage unit 4B employs the heat exchange member 42 whose heat storage temperature is 80° C.

Each of the branch points P4A and P4B is one example of a first branch point. Each of the low-temperature passage switching unit 2A and the high-temperature passage switching unit 2B is one example of a passage switching unit. Each of the low-temperature first branch line L621 and the high-temperature first branch line L721 is one example of a first branch line. Each of the low-temperature second branch line L622 and the high-temperature second branch line L722 is one example of a second branch line. The low-temperature heat storage unit 4A is one example of a latent heat storage member and a first latent heat storage member. The high-temperature heat storage unit 4B is one example of the latent heat storage member and a second latent heat storage member. The connection point P1A is one example of a first connection point and a low-temperature side connection point. The connection point P1B is one example of the first connection point and a high-temperature side connection point.

The heat exchange system 2001 is provided with a flow distribution unit 2003 at a merging point P6 in which the connection line L53, the low-temperature supply line L61, and high-temperature fluid supply line L71 merge with each other. The merging point P6 and the flow distribution unit 2003 are provided closer to the temperature control member 110 relative to the connection point P2A of the low-temperature supply line L61 and the low-temperature bypass line L63 and the connection point P2B of the high-temperature fluid supply line L71 and the high-temperature bypass line L73.

The flow distribution unit 2003 is for example a spool valve and includes a first opening proportional valve V1 for controlling a communication state between the connection line L53 and the output line L51, a second opening proportional valve V2 for controlling a communication state between the low-temperature supply line L61 and the output line L51, and a third opening proportional valve V3 for controlling a communication state between the high-temperature fluid supply line L71 and the output line L51. The flow distribution unit 2003 is configured to synchronously operate the first opening proportional valve V1 to the third opening proportional valve V3 while keeping stable the flow rate of the temperature-regulating fluid to be fed into the output line L51 to adjust a mixture ratio of the temperature-regulating fluid, the low-temperature fluid, and the high-temperature fluid to control the temperature of the temperature-regulating fluid to be fed from the output line L51 to the temperature control member 110. In other words, according to the distribution ratio of the flow distribution unit 2003, the low-temperature fluid is distributed to the temperature control member 110 and the low-temperature bypass line L63 and the high-temperature fluid is distributed to the temperature control member 110 and the high-temperature bypass line L73. The flow distribution unit 2003 is one example of a first flow distribution unit and a flow distribution unit. The merging point P6 is one example of a merging section. Each of the connection points P2A and P2B is one example of a second connection point.

At a branch point P7 from which the connection line L53, the low-temperature fluid return line L62, and the high-temperature return line L72 branch off, check valves CV1, CV2, and CV3 are arranged. The branch point P7 is one example of a diverging section. The check valves CV1, CV2, and CV3 are one example of a flow divergence control unit. The check valve CV1 is placed on the connection line L53. The check valve CV2 is placed on the low-temperature fluid return line L62. The check valve CV3 is placed on the high-temperature return line L72. Accordingly, based on the distribution ratio of the flow distribution unit 2003, the temperature-regulating fluid is allowed to flow to the connection line L53, the low-temperature fluid return line L62, and the high-temperature return line L72.

The controller 11 of the heat exchange system 2001 configured as above switches between the heat exchange operation and the steady driving operation of the low-temperature chiller device 2120A for example according to any of the switching conditions in FIG. 8A and switches between the heat exchange operation and the steady driving operation of the high-temperature chiller device 2120B according to any of the switching conditions in FIG. 8B.

To be concrete, for example, when the temperature of the temperature control member 110 is stable, the controller 11 closes the first open-close valve 21A of the low-temperature passage switching unit 2A and the first open-close valve 21B of the high-temperature passage switching unit 2B, and opens the second open-close valve 22A of the low-temperature passage switching unit 2A and the second open-close valve 22B of the high-temperature passage switching unit 2B. For instance, the controller 11 operates the flow distribution unit 2003 to merge the low-temperature fluid with the temperature-regulating fluid but not to merge the high-temperature fluid with the temperature-regulating fluid in order to cool the temperature control member 110 by just that much of the heated amount by the heater 112. Thus, in both the low-temperature chiller device 2120A and the high-temperature chiller device 2120B, the steady driving operation is performed as in the first embodiment, thereby regenerating the low-temperature heat storage unit 4A and high-temperature heat storage unit 4B.

In contrast, for example, while the temperature of the temperature control member 110 is stable, when the controller 11 receives the set-temperature decreasing information, the controller 11 opens the first open-close valve 21A and closes the second open-close valve 22A in the low-temperature passage switching unit 2A. The controller 11 operates the flow distribution unit 2003 to merge the low-temperature fluid with the temperature-regulating fluid, but not to merge the high-temperature fluid with the temperature-regulating fluid. Thus, the heat exchange operation is performed on the low-temperature chiller device 2120A side as in the first embodiment, so that the load applied to the low-temperature chiller device 2120A is reduced. On the other hand, the steady driving operation is performed on the high-temperature chiller device 2120B side as in the first embodiment, so that the high-temperature heat storage unit 4B is regenerated.

Further, for example, while the temperature of the temperature control member 110 is stable, when the controller 11 receives the set-temperature increasing information, the controller 11 opens the first open-close valve 21B and closes the second open-close valve 22B in the high-temperature passage switching unit 2B. The controller 11 operates the flow distribution unit 2003 to merge the high-temperature fluid with the temperature-regulating fluid, but not to merge the low-temperature fluid with the temperature-regulating fluid. Thus, the heat exchange operation is performed on the high-temperature chiller device 2120B side as in the first embodiment, so that the load applied to the high-temperature chiller device 2120B is reduced. On the other hand, the steady driving operation is performed on the low-temperature chiller device 2120A side as in the first embodiment, so that the low-temperature heat storage unit 4A is regenerated.

According to the present embodiment, the low-temperature heat storage unit 4A having a low heat storage temperature is provided in the low-temperature fluid first branch line L621 of the low-temperature fluid return line L62 for returning the temperature-regulating fluid to the low-temperature chiller device 2120A, and the high-temperature heat storage unit 4B having a high heat storage temperature is provided in the high-temperature first branch line L721 of the high-temperature return line L72 for returning the temperature-regulating fluid to the high-temperature chiller device 2120B. This configuration can consequently return the temperature-regulating fluid to the low-temperature chiller device 2120A or the high-temperature chiller device 2120B after adjusting the temperature-regulating fluid close to the temperature of the low-temperature fluid or the temperature of the high-temperature fluid. Accordingly, the load applied to the low-temperature chiller device 2120A and the load applied to the high-temperature chiller device 2120B can be reduced. Further, since the low-temperature heat storage unit 4A and the high-temperature heat storage unit 4B can be regenerated by use of the heat of the low-temperature fluid and the heat of the high-temperature fluid, the load applied to the low-temperature chiller device 2120A and the load applied to the high-temperature chiller device 2120B can be reduced with energy saving.

The present invention is not limited to the foregoing embodiments and may be variously embodied in other specific forms. For instance, the heat exchange systems 1, 1001, and 2001 in the foregoing embodiments are used in the semiconductor manufacturing devices, but may be applied to another device for circulating a thermal medium through a chiller device and a target object.

The return line L2 does not need to branch off. However, in such a configuration that the return line L2 branches into the first branch line L21 and the second branch line L22 as in the foregoing embodiments, when the coolant supplied from the chiller device 120 is caused to flow to the heat storage unit 4 not via the temperature control member 110, the heat exchange members 42 of the heat storage unit 4 can be efficiently regenerated.

The first branch line L21 does not need to branch into the third branch line L211 and the fourth branch line L212. However, in such a configuration that the first branch line L21 branches into the third branch line L211 and the fourth branch line L212, for example, when the heat storage unit 4 does not need to be regenerated, it is possible to circulate the coolant by detouring the heat storage unit 4 and thus enhance the energy saving efficiency.

The passage forming members 41 may dispense with the metal fiber sheets 412. As an alternative, the passage forming members 41 may be configured such that the metal fiber sheets 412 may be internally provided in the pipe members 411 so as to be in contact with the passage planes 4111 by insertion under pressure or other techniques without forming the binding portions C1 and C2. However, in the configuration that each passage forming member 41 is provided with the binding portions C1 and C2 as in the above-described embodiment, the heat conductivity is enhanced between the metal fiber sheets 412 and the pipe members 411, thus prompting heat exchange between the thermal medium and the heat exchange members 42.

Figure 16:
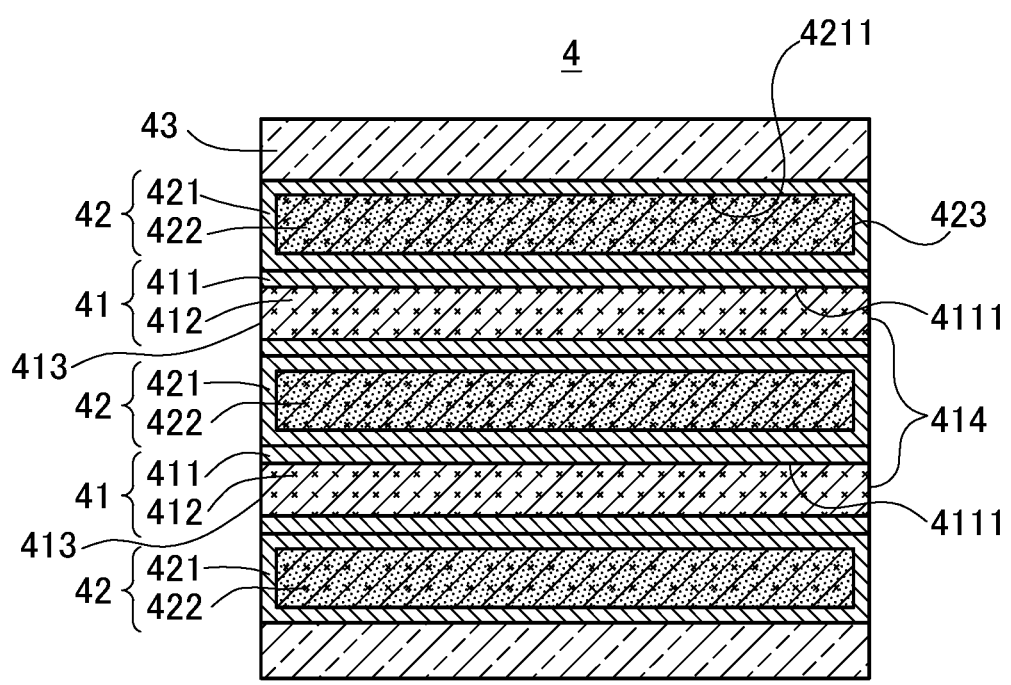
FIG. 16 is a diagram showing a modified example of a heat storage unit.

As shown in FIG. 16, a metal fiber sheet 423 (one example of a second metal fiber sheet) similar to the metal fiber sheet 412 may be provided in the internal space 4211 of each heat exchange member 42 so that the metal fiber sheets 423 contact with the casings 421. In this case, for example, the casing 421 with the metal fiber sheet 423 accommodated therein may be subjected to sintering to bond the metal fiber sheet 423 to the inner surface defining the internal space 4211. This configuration enables the latent heat storage material 422 to be introduced into the voids of the metal fiber sheet 423 and thus to exchange heat with the casing 421 through the metal fiber sheet 423. The heat exchange efficiency of the heat exchange member 42 can therefore be enhanced.

The metal fiber sheet may be provided to both the passage forming member 41 and the heat exchange member 42, or to any one of the passage forming member 41 and the heat exchange member 42, or to neither the passage forming member 41 nor the heat exchange member 42.

Each passage forming member 41 and each heat exchange member 42 do not need to have a rectangular parallelepiped shape. For instance, the passage forming member 41 and the heat exchange member 42 may be designed with different-sized cylindrical shapes and placed in a nested structure. In this case, preferably, a passage forming member is placed innermost in the radial direction and the heat exchange member 42 is placed outermost in the radial direction, and the outer peripheral surface is covered with a heat insulating material. However, when the passage forming member 41 and the heat exchange member 42 are designed with the same outer, rectangular parallelepiped shapes, it is possible to reduce a stock of the passage forming members 41 and the heat exchange members 42 and further simply change the structure and the heat storage capacity of the heat storage unit 4 according to a flow rate of a thermal medium and other factors.

The heat storage unit 4 may dispense with the heat insulating materials 43. For example, a unit composed of the passage forming members 41 and the heat exchange members 42 may be entirely hermetically closed and evacuated to vacuum insulate the entire unit.

The first temperature sensor 6 and the second temperature sensor 7 may be dispensed with so that the temperature of the thermal medium is regulated by only the temperature sensor 114. However, the configuration including the first temperature sensor 6 and the second temperature sensor 7 is more likely to accurately control the temperature of the thermal medium.

In the heat storage unit 4 configured as above, each pipe member 411 and each casing 421 of the heat exchange members 42 are independent from each other. As an alternative, the pipe member 411 are dispensed with and each casing may be formed with a flow passage for flowing a thermal medium to function as the pipe member 411. In this case, a metal fiber sheet may be internally provided to the flow passage of each casing in a similar manner to the pipe member 411.

For example, the pipe members 411, the metal fiber sheets 412, and the casings 421 may be made of an inexpensive material, such as plastic, on each surface of which a metal film having a high heat conductivity is formed. The passage surfaces 4111 of the pipe members 411 and the surfaces of the metal fiber sheets 412 may be coated with a material resistant to corrosion and resistant to chemicals, such as nickel plating.

REFERENCE SIGNS LIST

1 Heat exchange system
2 Ppassage switching unit
3 Flow distribution unit
110 Temperature control member (One example of a control target object)
120 Chiller device
L1 Supply line
L2 Return line
L3 Bypass line
L21 First branch line
L22 Second branch line
P1 First connection point
P2 Second connection point
P4 Branch point

The invention claimed is:

1. A heat exchange system placed between a chiller device and a control target object, the heat exchange system comprising:
  a supply line for supplying a thermal medium from the chiller device to the control target object;
  a return line for returning the thermal medium from the control target object to the chiller device;
  a bypass line for supplying the thermal medium between the supply line and the return line;
  a latent heat storage member placed in the return line at a position closer to the chiller device relative to a first connection point at which the return line and the bypass line connect to each other, the latent heat storage member being configured to store and release heat; and
  at least one first flow distribution unit placed at a second connection point at which the supply line and the bypass line connect to each other or at a position in the supply line closer to the control target object relative to the second connection point, the at least one first flow distribution valve being configured to distribute the thermal medium to the control target object and the bypass line, wherein:
    the return line branches into a first branch line and a second branch line at a first branch point provided upstream of the first connection point,
    the heat exchange system includes at least one passage switching valve placed in the first branch point and configured to supply the thermal medium flowing from the control target object into the return line to the first branch line or the second branch line,
    the first branch line includes the first connection point, connects to the bypass line, and communicates with the chiller device, and further the latent heat storage member is placed in the first branch line at a position closer to the chiller device relative to the first connection point, and
    the second branch line connects to the first branch line at a third connection point provided at a position closer to the chiller device relative to the latent heat storage member.

2. The heat exchange system according to claim 1, wherein
  the return line includes the first branch line further branching into a third branch line and a fourth branch line at a second branch point located at a position closer to the chiller device relative to the first connection point,
  the heat exchange system includes at least one second flow distribution valve provided at the second branch point and configured to distribute the thermal medium flowing in the first branch line through the bypass line to the third branch line and the fourth branch line,
  the third branch line is provided with the third connection point and connects to the second branch line and communicates with the chiller device, and
  the fourth branch line connects to the second branch line, and the latent heat storage member is placed in the fourth branch line.

3. The heat exchange system according to claim 1, wherein
  the thermal medium is a low-temperature medium for cooling the control target object,
  the latent heat storage member is configured such that:
    a heat storage temperature is set lower than a temperature of the thermal medium flowing from the control target object to the return line; and
    when the at least one passage switching valve switches a flow passage for supplying the thermal medium to the first branch line, the thermal medium flowing from the control target object to the return line is cooled by stored heat energy, or
    when the at least one passage switching valve switches the flow passage for supplying the thermal medium to the second branch line, the latent heat storage member is regenerated by the thermal medium flowing in the first branch line through the bypass line.

4. The heat exchange system according to claim 1, wherein
  the thermal medium is a high-temperature medium for heating the control target object,
  the latent heat storage member is configured such that:
    a heat storage temperature is set higher than a temperature of the thermal medium flowing from the control target object to the return line; and
    when the at least one passage switching valve switches a flow passage for supplying the thermal medium to the first branch line, the thermal medium flowing from the control target object to the return line is heated by stored heat energy, or
    when the at least one passage switching valve switches the flow passage for supplying the thermal medium to the second branch line, the latent heat storage member is regenerated by the thermal medium flowing from the bypass line to the first branch line.

5. The heat exchange system according to claim 2, wherein
  the thermal medium is a low-temperature medium for cooling the control target object,
  the latent heat storage member is configured such that:

a heat storage temperature is set lower than a temperature of the thermal medium flowing from the control target object to the return line; and when the at least one passage switching valve switches a flow passage for supplying the thermal medium to the first branch line, the thermal medium flowing from the control target object to the return line is cooled by stored heat energy, or when the at least one passage switching valve switches the flow passage for supplying the thermal medium to the second branch line, the latent heat storage member is regenerated by the thermal medium flowing in the first branch line through the bypass line.

6. The heat exchange system according to claim 2, wherein the thermal medium is a high-temperature medium for heating the control target object, the latent heat storage member is configured such that:

a heat storage temperature is set higher than a temperature of the thermal medium flowing from the control target object to the return line; and when the at least one passage switching valve switches a flow passage for supplying the thermal medium to the first branch line, the thermal medium flowing from the control target object to the return line is heated by stored heat energy, or when the at least one passage switching valve switches the flow passage for supplying the thermal medium to the second branch line, the latent heat storage member is regenerated by the thermal medium flowing from the bypass line to the first branch line.

7. The heat exchange system according to claim 1, wherein the control target object is a temperature control member placed in a reaction container of a semiconductor manufacturing device and configured to control a temperature of a wafer.

8. The heat exchange system according to claim 2, wherein the control target object is a temperature control member placed in a reaction container of a semiconductor manufacturing device and configured to control a temperature of a wafer.

9. The heat exchange system according to claim 1, wherein the latent heat storage member is a heat storage unit including:

a pipe member provided with a flow passage for flowing the thermal medium; and a heat exchange member filled with latent heat storage material and placed in surface contact with the pipe member.

10. The heat exchange system according to claim 9, wherein the pipe member is internally provided with a first metal fiber sheet in contact with an inner wall of the flow passage, and the first metal fiber sheet includes voids allowing the thermal medium to flow in.

11. The heat exchange system according to claim 10, wherein the pipe member and the heat exchange member each have a thin rectangular parallelepiped shape and are stacked.

12. A heat exchange system placed between a first chiller device for storing a first thermal medium, a second chiller device for storing a second thermal medium higher in temperature than the first thermal medium, and a control target object whose temperature is controlled by use of a temperature-regulating fluid, the heat exchange system comprising:

a main circulation circuit configured to circulate the temperature-regulating fluid through the control target object and provided with a merging section and a diverging section provided between the merging section and the control target object;

a first supply line for supplying the first thermal medium from the first chiller device to the merging section;

a first return line for returning the temperature-regulating fluid from the diverging section to the first chiller device;

a first bypass line for supplying the first thermal medium between the first supply line and the first return line;

a first latent heat storage member placed in the first return line at a position closer to the first chiller device relative to a low-temperature side connection point at which the the first return line and the first bypass line connect to each other, the first latent heat storage member being configured to store and release heat;

a second supply line for supplying the second thermal medium from the second chiller device to the merging section;

a second return line for returning the temperature-regulating fluid from the merging section to the second chiller device;

a second bypass line for supplying the second thermal medium between the second supplying line and the second return line;

a second latent heat storage member placed in the second return line at a position closer to the second chiller device relative to a high-temperature side connection point at which the second return line and the second bypass line connect to each other, the second latent heat storage member being configured to store and release heat, the second latent heat storage member being higher in heat storage temperature than the first latent heat storage member;

at least one flow distribution valve placed in the merging section and configured to distribute the temperature-regulating fluid, the first thermal medium, and the second thermal medium toward a control target object, the first bypass line, and the second bypass line; and at least one flow divergence control valve placed in the diverging section and configured to diverge the temperature-regulating fluid toward the main circulation circuit, the first return line, and the second return line.

13. The heat exchange system according to claim 9, wherein the heat exchange member includes:

a casing having an internal space filled with the latent heat storage material; and a second metal fiber sheet placed in the internal space, and the second metal fiber sheet is in contact with the casing.

14. The heat exchange system according to claim 2, wherein the latent heat storage member is a heat storage unit including:

a pipe member provided with a flow passage for flowing the thermal medium; and a heat exchange member filled with latent heat storage material and placed in surface contact with the pipe member.

15. The heat exchange system according to claim 9, wherein the heat exchange member includes:
- a casing having an internal space filled with the latent heat storage material; and
- a second metal fiber sheet placed in the internal space, and the second metal fiber sheet is in contact with the casing.

* * * * *